United States Patent
Lee et al.

(10) Patent No.: US 11,100,352 B2
(45) Date of Patent: Aug. 24, 2021

(54) CONVOLUTIONAL NEURAL NETWORK FOR OBJECT DETECTION

(71) Applicant: Samsung Electronics Co., Ltd., Suwon-si (KR)

(72) Inventors: Hyunku Lee, Suwon-si (KR); Hyunsurk Ryu, Hwaseong-si (KR); Ha Young Kim, Suwon-si (KR); BaRom Kang, Suwon-si (KR)

(73) Assignees: SAMSUNG ELECTRONICS CO., LTD., Gyeonggi-do (KR); AJOU UNIVERSITY INDUSTRY-ACADEMIC COOPERATION FOUNDATION, Gyeonggi-do (KR)

( * ) Notice: Subject to any disclaimer, the term of this patent is extended or adjusted under 35 U.S.C. 154(b) by 18 days.

(21) Appl. No.: 16/576,278

(22) Filed: Sep. 19, 2019

(65) Prior Publication Data

US 2020/0117937 A1 Apr. 16, 2020

(30) Foreign Application Priority Data

Oct. 16, 2018 (KR) .................. 10-2018-0123183
Mar. 28, 2019 (KR) .................. 10-2019-0036153

(51) Int. Cl.
*G06K 9/32* (2006.01)
*G06F 17/15* (2006.01)
(Continued)

(52) U.S. Cl.
CPC .......... *G06K 9/3233* (2013.01); *G06F 17/15* (2013.01); *G06N 3/084* (2013.01); *G06T 7/70* (2017.01)

(58) Field of Classification Search
CPC combination set(s) only.
See application file for complete search history.

(56) References Cited

U.S. PATENT DOCUMENTS 9,275,308 B2 3/2016 Szegedy et al.
9,514,389 B1 12/2016 Erhan et al.
(Continued)

FOREIGN PATENT DOCUMENTS

JP 2015-082323 A 4/2015
KR 10-1218637 1/2013

OTHER PUBLICATIONS

Guanbin Li , "Deep Contrast Learning for Salient Object Detection", Proceedings of the IEEE Conference on Computer Vision and Pattern Recognition (CVPR), 2016,Jul. 5, 2016 ,pp. 478-481.*

(Continued)

*Primary Examiner* — Omar S Ismail
(74) *Attorney, Agent, or Firm* — Harness, Dickey & Pierce, P.L.C.

(57) ABSTRACT

Disclosed is a computer-readable medium including a program code that, when executed by processing circuitry, causes the processing circuitry to generate a feature map from an input image, to extract a region of interest from the feature map, and to generate a predicted mask based on the region of interest. The processing circuitry may use a predicted mask and a real mask to learn a convolutional neural network system. The real mask includes first pixels corresponding to the real boundary and second pixels corresponding to a fake boundary adjacent to the real boundary.

20 Claims, 21 Drawing Sheets

(51) Int. Cl.
*G06N 3/08* (2006.01)
*G06T 7/70* (2017.01)

(56) References Cited

U.S. PATENT DOCUMENTS

| | | | |
|---|---|---|---|
| 9,858,496 | B2 | 1/2018 | Sun et al. |
| 9,972,092 | B2 | 5/2018 | Lin et al. |
| 10,067,509 | B1* | 9/2018 | Wang ................... G06K 9/66 |
| 2004/0208395 | A1* | 10/2004 | Nomura ................. G06T 5/002 382/275 |
| 2017/0206431 | A1* | 7/2017 | Sun ..................... G06F 16/5838 |
| 2017/0213081 | A1 | 7/2017 | Nathan et al. |
| 2017/0343481 | A1* | 11/2017 | Jahanshahi ............. G06T 7/44 |
| 2019/0172223 | A1* | 6/2019 | Vajda ................... G06K 9/4633 |

OTHER PUBLICATIONS

Gregory J. Stein ,"GeneSIS-RT: Generating Synthetic Images for training SecondaryReal-world Tasks",May 21-25, 2018,2018 IEEE International Conference on Robotics and Automation (ICRA),pp. 7151-7157.*
Siyang Sun,"Fast object detection based on binary deep convolution neural networks",Oct. 21, 2018,CAAI Transactions on Intelligence Technology,2018, vol. 3, Iss. 4, pp. 191-194.*
Philipp Krahenbuhl et al., "Efficient Inference in Fully Connected CRFs with Gaussian Edge Potentials", Advances in Neural Information Processing Systems, vol. 24, 2011.
Shaoqing Ren et al., "Faster R-CNN: Towards Real-Time Object Detection with Region Proposal Networks", IEEE Transactions on Pattern Analysis and Machine Intelligence, vol. 39, 2015.
Pedro O. Pinheiro et al., "Learning to Segment Object Candidates", NIPS'15 Proceedings of the 28th International Conference on Neural Information Processing Systems, vol. 2, 2015.
Jifeng Dai et al., "R-FCN: Object Detection via Region-based Fully Convolutional Networks", 30th Conference on Neural Information Processing Systems (NIPS 2016), Barcelona, Spain.
Min Bai et al., "Deep Watershed Transform for Instance Segmentation", 2017 IEEE Conference on Computer Vision and Pattern Recognition (CVPR), 2017.
Marius Cordts et al., "The Cityscapes Dataset for Semantic Urban Scene Understanding", 2016 IEEE Conference on Computer Vision and Pattern Recognition (CVPR), 2016.
Jifeng Dai et al., "Instance aware semantic Segmentation via Multi-task Network Cascades", 2016 IEEE Conference on Computer Vision and Pattern Recognition (CVPR), 2016.
Tsung-Yi Lin, et al., "Focal Loss for Dense Object Detection", 2017 IEEE International Conference on Computer Vision (ICCV), 2017.
Ross Girshick, "Fast R-CNN", ICCV '15 Proceedings of the 2015 IEEE International Conference on Computer Vision (ICCV), 2015.
Ross Girshick et al., "Rich feature hierarchies for accurate object detection and semantic segmentation", 2014 IEEE Conference on Computer Vision and Pattern Recognition, 2014.
Jia Deng et al., "ImageNet: A Large-Scale Hierarchical Image Database", 2009 IEEE Conference on Computer Vision and Pattern Recognition, 2009.
Jifeng Dai et al., "Instance-sensitive Fully Convolutional Networks", Microsoft Research, Rsinghua University, University of Science and Technology, Mar. 29, 2016.
Alexander Kirillov et al., "InstanceCut: from Edges to Instances with MultiCut", 2017 IEEE Conference on Computer Vision and Pattern Recognition (CVPR), 2017.
Yi Li et al., "Fully Convolutional Instance-aware Semantic Segmentation", 2017 IEEE Conference on Computer Vision and Pattern Recognition (CVPR), 2017.
Tsung-Yi Lin et al., "Feature Pyramid Networks for Object Detection", 2017 IEEE Conference on Computer Vision and Pattern Recognition (CVPR), 2017.
Shu Liu et al., "SGN: Sequentiao Grouping Networks for Instance Instance Segmentation", 2017 IEEE International Conference on Computer Vision (ICCV), 2017.
Jonathan Long et al., "Fully Convolutional Networks for Semantic Segmentation", 2015 IEEE Conference on Computer Vision and Pattern Recognition (CVPR), 2015.
Kaiming He et al., "Mask R-CNN", The IEEE International Conference on Computer Vision (ICCV), 2017.
Tsung-Yi Lin et al., "Microsoft COCO: Common Objects in Context ", Computer Vision—ECCV 2014.
Pierre Sermanet et al., "OverFeat: Integrated Recognition, Localization and Detection using Convolutional Networks", Courant Institute of Mathematical Sciences, New York University, New York, NY, arXiv:1312.6229v4 [cs.CV], Feb. 24, 2014.
Joseph Redmon et al., "You Only Look Once: Unified, Real-Time Object Detection", The IEEE Conference on Computer Vision and Pattern Recognition (CVPR), 2016.
R. C. Prim, "Shortest Connection Networks and Some Generalizations", The Bell System Technical Journal, Nov. 1957, pp. 1389-1401.
Abhinav Shrivastava et al., "Training Region-based Object Detectors with Online Hard Example Mining", The IEEE Conference on Computer Vision and Pattern Recognition (CVPR), 2016.
Wei Liu et al., "SSD: Single Shot MultiBox Detector", Computer Vision—ECCV 2016.
J.R.R. Uijlings et al., "Selective Search for Object Recognition", Int J. Comput Vis (2013) 104:154-171, Sep. 2013, Springer Science + Business Media New York.

* cited by examiner

FIG. 7

■ : Real Boundary

FIG. 8

■ : Real Boundary
▦ : Inner Fake Boundary
▨ : Outer Fake Boundary

FIG. 9

■ : Real Boundary
▨ : Inner Fake Boundary

FIG. 10

■ : Real Boundary
▨ : Outer Fake Boundary

FIG. 11

| 0 | 0 | 0 | 0 | 0 | 0 | 0 | 0 | 0 | 0 | 0 | 0 | .9 | .9 | .9 | .9 | .9 | 0 |
|---|---|---|---|---|---|---|---|---|---|---|---|----|----|----|----|----|----|
| 0 | 0 | 0 | .9 | .9 | .9 | .9 | .9 | .9 | .9 | .9 | .9 | 1 | 1 | 1 | 1 | 1 | .9 |
| 0 | 0 | .9 | 1 | 1 | 1 | 1 | 1 | 1 | 1 | 1 | 1 | .9 | .9 | .9 | .9 | 1 | .9 |
| 0 | .9 | 1 | .9 | .9 | .9 | .9 | .9 | .9 | .9 | .9 | .9 | 0 | 0 | 0 | .9 | 1 | .9 |
| 0 | .9 | 1 | .9 | 0 | 0 | 0 | 0 | 0 | 0 | 0 | 0 | 0 | 0 | 0 | .9 | 1 | .9 |
| .9 | 1 | .9 | 0 | 0 | 0 | 0 | 0 | 0 | 0 | 0 | 0 | 0 | 0 | .9 | 1 | .9 | 0 |
| .9 | 1 | .9 | 0 | .9 | .9 | .9 | 0 | .9 | .9 | .9 | .9 | 0 | .9 | 1 | .9 | 0 | 0 |
| 0 | .9 | 1 | .9 | 1 | 1 | 1 | .9 | 1 | 1 | 1 | 1 | .9 | 1 | .9 | 0 | 0 | 0 |
| 0 | 0 | .9 | 1 | .9 | .9 | .9 | 1 | .9 | .9 | .9 | .9 | 1 | .9 | 0 | 0 | 0 | 0 |
| 0 | 0 | 0 | .9 | 0 | 0 | 0 | .9 | 0 | 0 | 0 | 0 | .9 | 0 | 0 | 0 | 0 | 0 |

▓ : Real Boundary
░ : Inner Fake Boundary
▨ : Outer Fake Boundary

FIG. 14

| 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 0 |
| 0 | 1 | 0 | 0 | 0 | 0 | 0 | 0 | 0 | 0 | 0 | 0 | 0 | 0 | 0 | 1 | 0 |
| 0 | 1 | 0 | 0 | 0 | 0 | 0 | 0 | 0 | 0 | 0 | 0 | 0 | 0 | 0 | 1 | 0 |
| 0 | 1 | 0 | 0 | 0 | 0 | 0 | 0 | 0 | 0 | 0 | 0 | 0 | 0 | 0 | 1 | 0 |
| 0 | 1 | 0 | 0 | 0 | 0 | 0 | 0 | 0 | 0 | 0 | 0 | 0 | 0 | 0 | 1 | 0 |
| 0 | 1 | 0 | 0 | 0 | 0 | 0 | 0 | 0 | 0 | 0 | 0 | 0 | 0 | 0 | 1 | 0 |
| 0 | 1 | 0 | 0 | 0 | 0 | 0 | 0 | 0 | 0 | 0 | 0 | 0 | 0 | 0 | 1 | 0 |
| 0 | 1 | 1 | 1 | 1 | 1 | 1 | 1 | 1 | 1 | 1 | 1 | 1 | 1 | 1 | 1 | 0 |
| 0 | 0 | 0 | 0 | 0 | 0 | 0 | 0 | 0 | 0 | 0 | 0 | 0 | 0 | 0 | 0 | 0 |

▨ : Real Bounding Box

FIG. 15

| 1 | 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 |
| 1 | 1 | 1 | 0 | 0 | 0 | 0 | 0 | 0 | 0 | 0 | 0 | 0 | 0 | 1 | 1 | 1 |
| 1 | 1 | 1 | 0 | 0 | 0 | 0 | 0 | 0 | 0 | 0 | 0 | 0 | 0 | 1 | 1 | 1 |
| 1 | 1 | 1 | 0 | 0 | 0 | 0 | 0 | 0 | 0 | 0 | 0 | 0 | 0 | 1 | 1 | 1 |
| 1 | 1 | 1 | 0 | 0 | 0 | 0 | 0 | 0 | 0 | 0 | 0 | 0 | 0 | 1 | 1 | 1 |
| 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 |

▨ : Real Bounding Box
▢ : Inner Fake Bounding Box
▨ : Outer Fake Bounding Box

CONVOLUTIONAL NEURAL NETWORK FOR OBJECT DETECTION

CROSS-REFERENCE TO RELATED APPLICATIONS

This application claims priority under 35 U.S.C. § 119 to Korean Patent Application Nos. 10-2018-0123183 filed on Oct. 16, 2018, and 10-2019-0036153 filed on Mar. 28, 2019, in the Korean Intellectual Property Office, the disclosures of which are incorporated by reference herein in their entireties.

BACKGROUND

Some example embodiments of some inventive concepts described herein relate to a convolutional neural network system, and more particularly, relate to a convolutional neural network system capable of improving learning efficiency and an operating method thereof.

In the context of object detection of an image or a video, a convolutional neural network that is based on deep learning is being researched and developed actively. The convolutional neural network includes a plurality of layers for repeatedly performing a convolution operation and a pooling operation. However, because object detection performance of the convolutional neural network and a depth of the convolutional neural network are in a trade-off relationship, there are many attempts on a way to improve performance of object detection at the same time with simplifying an algorithm of the neural network.

In some examples of object detection, instance segmentation may have an issue with distinguishing objects from each other in addition to an issue with identifying an object from a background. In general, a lot of operations and learning may be utilized to improve the efficiency of the instance segmentation. In addition, the instance segmentation may be directly related to the performance of the object detection. Therefore, it an algorithm may be desired that may improve the performance of the instance segmentation and that is relatively simple.

SUMMARY

Some example embodiments of some inventive concepts provide a convolutional neural network system that may be capable of improving learning efficiency.

In detail, some example embodiments of some inventive concepts may provide a way to improve the learning efficiency by changing a pixel thickness of a real mask used for learning.

According to some example embodiments, a computer-readable medium includes a program code that, when executed by processing circuitry, causes the processing circuitry to perform a convolution operation on an input image to generate a feature map, to extract a region of interest based on an objectness score associated with an existence of an object from the feature map, to align the extracted region of interest to a region of interest having a reference size, to determine a class of the object and position information of the object on the input image based on the aligned region of interest, to form a boundary encompassing the object on the input image based on a result of the determination, and to learn a convolutional neural network system based on a predicted mask that is based on the class, the position information, and/or the boundary, and/or a real mask based on a real boundary of the object of the input image, and/or the real mask includes first pixels corresponding to the real boundary and/or second pixels corresponding to a fake boundary adjacent to the real boundary. That is, the second pixels may be adjacent to an outer side of the real boundary composed of the first pixels; the fake boundary may be a first fake boundary; and the real mask may include third pixels corresponding to the first fake boundary adjacent to an inner side of the real boundary.

According to some example embodiments, a computer-readable medium includes a program code that, when executed by processing circuitry, causes the processing circuitry to perform a convolution operation on an input image to generate a feature map, to extract a region of interest based on an objectness score associated with an existence of an object from the feature map, to align the extracted region of interest to a region of interest having a reference size, to determine a class of the object and position information of the object on the input image based on the aligned region of interest, to form a boundary encompassing the object on the input image based on a result of the determination and to learn a convolutional neural network system based on a predicted mask based on the class, the position information, and/or the boundary, and/or a real mask including a real bounding box encompassing the object of the input image, and/or the real mask includes first pixels corresponding to the real bounding box and second pixels corresponding to a fake bounding box adjacent to the real bounding box.

According to some example embodiments, a convolutional neural network system includes processing circuitry that is configured to perform a convolution operation on an input image to generate a feature map, extract a region of interest based on an objectness score associated with an existence of an object from the feature map, align the extracted region of interest to a region of interest having a reference size, a classifier that determines a class of the object based on the aligned region of interest, determine position information of the object on the input image based on the aligned region of interest, and form a boundary encompassing the object on the input image. The convolutional neural network system may use a predicted mask based on the class, the position information, and the boundary, and a real mask based on a real boundary of the object of the input image, and the real mask may include first pixels corresponding to the real boundary and second pixels corresponding to a fake boundary adjacent to the real boundary.

BRIEF DESCRIPTION OF THE FIGURES

The above and other objects and features of the inventive concept will become apparent by describing in detail exemplary embodiments thereof with reference to the accompanying drawings.

FIG. 7 illustrates an example general real mask that may be used with a predicted mask output from a segmentator according to some example embodiments.

FIG. 8 illustrates an example real mask that may be used with a predicted mask, according to some example embodiments of the present disclosure.

FIGS. 9 and 10 illustrate example thick bounding shape masks that may be used with a predicted mask, according to some example embodiments of the present disclosure.

FIG. 11 illustrates an example real mask that may be used with a predicted mask, according to some example embodiments of the present disclosure.

FIG. 14 illustrates an example general real mask that is used with a predicted mask output from a segmentator.

FIG. 15 illustrates an example real mask that may be used with a predicted mask, according to some example embodiments of the present disclosure.

DETAILED DESCRIPTION

Below, some example embodiments of some inventive concepts are described in detail and clearly to such an extent that an ordinary one in the art may easily implement some inventive concepts.

Components that are described in the detailed description with reference to the terms "unit", "module", "block", "~er or ~or", etc. and function blocks illustrated in drawings may be implemented with software, hardware, or a combination thereof. In some example embodiments, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
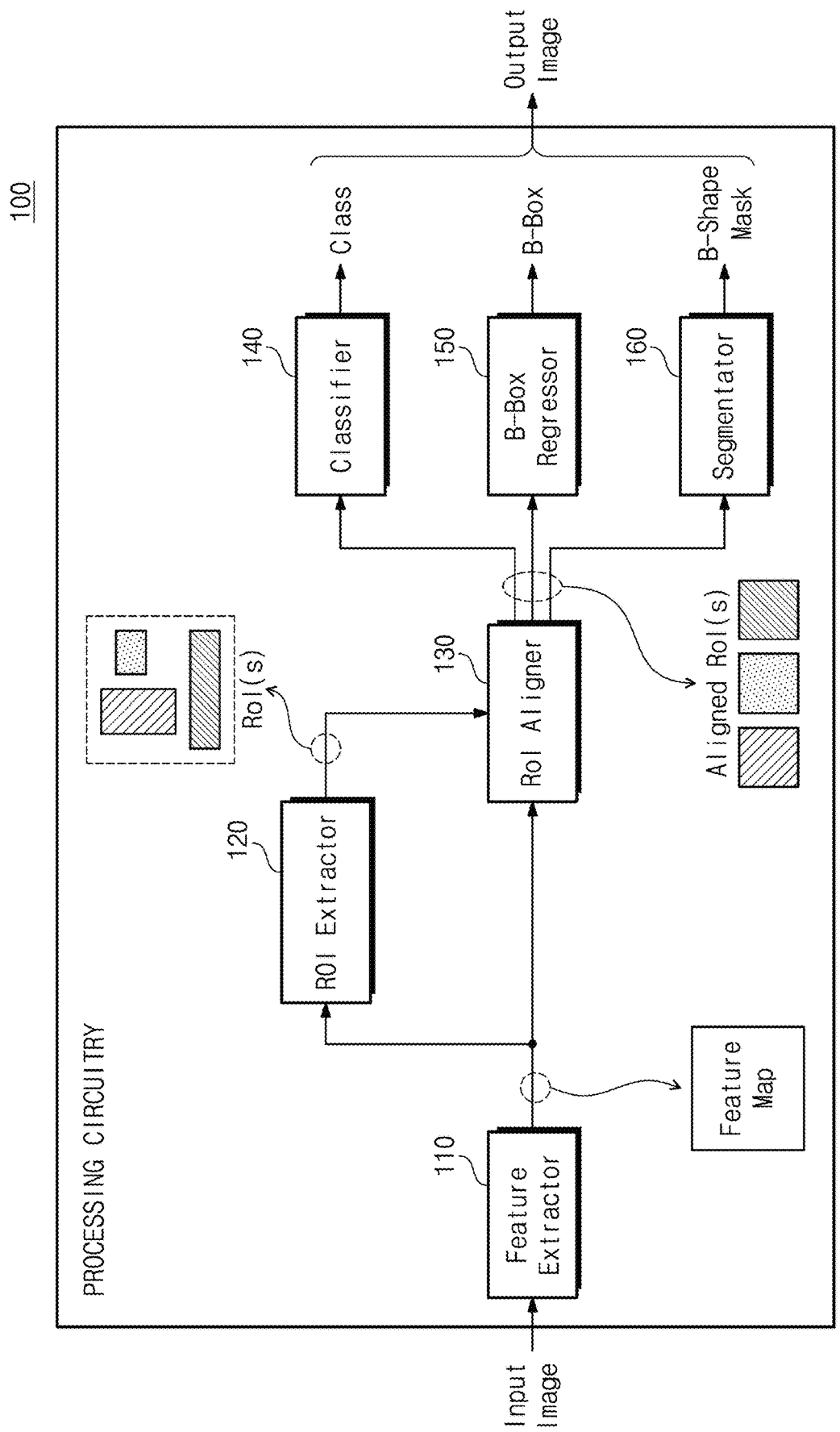
FIG. 1 illustrates an example configuration of a convolutional neural network system according to some example embodiments of the present disclosure.

FIG. 1 illustrates an example configuration of a convolutional neural network system according to some example embodiments of the present disclosure. In the example of FIG. 1, a convolutional neural network system 100 is configured to process an input image and to generate an output image. For example, the output image includes a bounding shape encapsulating a contour of an object included in an image and/or a bounding box that defines boundaries of an object as a rectangular box. In other words, the convolutional neural network system 100 may be configured to search for an object included in an image and/or to generate the bounding shape and/or the bounding box corresponding a detection result.

In some example embodiments, one or more components of the convolutional neural network system may be included in and/or implemented by processing circuitry. For example, the processing circuitry may include hardware such as logic circuits; a hardware/software combination, such as a processor executing software; or a combination thereof. For example, a processor may include, but is not limited to, a central processing unit (CPU), a graphics processing unit (GPU), a tensor processing unit (TPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Some example embodiments may include computer-readable media (CRM). Such computer-readable media may include a variety of computer-readable media types. As a first example, a first subset of computer-readable media may include physical and tangible media, such as a hard disk drive, a solid-state storage device, a flash memory device, a magnetic and/or electronic circuit such as a memory chip, and/or optical media such as a CD-ROM or DVD-ROM; a second subset of computer-readable media may include intangible media such as propagating electromagnetic signals; and a third subset of computer-readable media may include a combination of one or more physical and tangible media and one or more intangible media. As a second example, a first subset of computer-readable media may include volatile memory, such as system RAM that is periodically refreshed; a second subset of computer-readable media may include nonvolatile and/or non-transitory memory, such as a hard disk drive; and a third subset of computer-readable media may include a combination of volatile memory and nonvolatile or non-transitory memory, such as persistent memory. As a first set of example embodiments, computer-readable media may encode program code (such as a set of instructions) that, when read and processed by processing circuitry, causes the processing circuitry to perform operations that include at least a portion of the present disclosure. As a second set of example embodiments, computer-readable media may include data that was generated by another example embodiment, such as by processing circuitry, that generates a neural network system in accordance with the present disclosure. As a third set of example embodiments, computer-readable media may include data that promotes or enables generation of another example embodiment, such as a serialized version of a neural network system in accordance with the present disclosure and/or a mapping of a field-programmable gate array (FPGA) that, when programmed using the mapping, operates as a neural network system in accordance with the present disclosure. Some computer-readable media may include a combination of one or more such example embodiments such as described herein.

In some example embodiments, a convolutional neural network system 100 may include a convolutional neural network (CNN) that repeatedly performs a convolution operation between input data or a kernel indicating a specific feature and a specific parameter (e.g., a weight or a bias). For example, the convolutional neural network may be based on, but is not limited to, R-CNN, Fast R-CNN, Faster R-CNN, Mask R-CNN, and/or various types of convolutional neural networks similar thereto. Below, in the specification, a convolutional neural network system that is based on Mask R-CNN will be described in some examples.

In some example embodiments, the convolutional neural network system 100 may include a feature extractor 110, a region of interest (RoI) extractor 120, a RoI aligner 130, a classifier 140, a bounding box regressor 150, and/or a segmentator 160.

In some example embodiments, the processing circuitry may include a feature extractor 110, which may include a plurality of layers that are configured to apply a plurality of feature maps from an input image. For example, the feature extractor 110 may include at least one convolution layer that is configured to perform a convolution operation and/or at least one pooling layer that is configured to perform a computation operation (such as sub-sampling). The feature extractor 110 may be configured to determine a pattern of the input image and/or to extract a feature, for example, by repeatedly performing the convolution operation and/or the pooling operation. In some example embodiments, the feature extractor 110 may include ResNet101, ResNet50, or a network similar thereto.

In some example embodiments, the processing circuitry may include a RoI extractor 120, which may be configured to search at least one region, which may include an object from a feature map. This region is called a "region of interest (RoI)". The RoI extractor 120 may include a region proposal network (RPN) that is configured to determine a region in which an object may (e.g., is likely to) exist on a feature map. The RPN may be configured to scan the feature map in a sliding manner, for example, by using a plurality of anchors, and/or may search the RoI. For example, the RPN may add an "objectness score" to one or more proposals. The "objectness score" may mean a score (probability) associated with whether or not an object is visible in the RoI and/or whether or not a presented set of pixels in the image comprises an object. For example, the RPN may be implemented, but is not limited to, with a fully convolutional network.

In some example embodiments, the processing circuitry may include an RoI aligner 130, which may be configured to adjust a size of each RoI output from the RoI extractor 120 and/or to generate a feature map. For example, the RoI aligner 130 may be configured to convert various sizes of RoIs into a reference size. For example, RoIs of various sizes may be extracted by the RoI extractor 120. In some example embodiments, real coordinates of the feature map may be quantized to adjust various sizes of RoIs. However, in some examples, this adjustment may cause misalignment due to a characteristic of the quantization. Therefore, in some example embodiments, the RoI aligner 130 may be configured to adjust a size of each RoI by using bilinear interpolation.

In some example embodiments, the processing circuitry may include a classifier 140, which may be configured to determine information related to a class of each aligned RoI and/or an object visible therein. For example, a class means a specific class (e.g., a person, a chair, or a car) of an object in each aligned RoI. In some example embodiments, the classifier 140 may be configured to determine a score associated with whether an object of each aligned RoI belongs to a specific class and/or to determine a class of a RoI, for example, based on the determined score.

In some example embodiments, the processing circuitry may include a bounding box regressor 150, which may be configured to determine information related to a location of each aligned RoI. For example, information related to a location of a RoI may relate to a position and/or a size of a rectangular bounding box encompassing each aligned RoI. For example, the information related to the location of the RoI may include coordinates of four vertexes of a rectangular bounding box encompassing an object on the input image.

In some example embodiments, the classifier 140 and/or the bounding box regressor 150 described above may be implemented with a region classification network (RCN). For example, the classifier 140 and/or the bounding box regressor 150 are illustrated in the example embodiment of FIG. 1 as independent components, but in some other example embodiments, the two components may be implemented with one function block as the RCN. In this case, the RCN may include a plurality of fully-connected networks, and an operation using the fully-connected network may be referred to as a "fully-connected operation." An aligned RoI that is input to the fully-connected network may be fully-connected data, and/or all nodes of input data may maintain a connection relationship with all nodes of output data. In some example embodiments, the class of the object and the position information of the object on the input image may be determined using a plurality of fully-connected networks.

In some example embodiments, the processing circuitry may include a segmentator 160, which may be configured to generate a bounding shape mask for object detection. For example, because the segmentator 160 may perform segmentation based on each aligned RoI, the segmentator 160 may be configured to identify a plurality of objects belonging to the same class. In addition, because the segmentator 160 may be configured to generate a bounding shape mask per each class, collision between classes may not occur or may be reduced. In some example embodiments, the segmentator 160 may include a fully-convolutional network (FCN). In some example embodiments, in the case where the segmentator 160 is implemented with the FCN, various networks such as AlexNet, VGGNet, GoogLeNet, or a network similar thereto may be used. In some example embodiments, to prevent the loss of location information of an object due to the FCN, the last layer of the FCN may be implemented with a 1×1 convolution layer. As a result, spatial information of each aligned RoI may be maintained and/or a score value of an object having a high value may be output.

In some example embodiments, a bounding shape mask output from the segmentator 160 may be an inaccurate mask that is not matched with a contour of a real object. Therefore, the convolutional neural network system 100 may be configured to perform learning on the segmentator 160 through backpropagation. That is, a process of reducing an error by adjusting a bias and/or weight value of a network constituting the segmentator 160 may be performed. In addition, because a class of an object and a bounding box may be inaccurate, learning may be performed using a neural network system including the classifier 140 and/or the bounding box regressor 150.

As used herein, "learning" may refer to training of the neural network system or a portion thereof, wherein such training may include a variety of training models such as supervised, unsupervised, and/or reinforcement-based training. Also, as used herein, "learning" may refer to an evaluation of the performance of a previously and/or currently trained neural network system, such as verifying continued adequate performance of the neural network system and/or to determine whether further training may be desirable to maintain performance and/or adjust based on new data, such as new types of images or objects.

In some example embodiments, learning of the neural network system may be performed based on a bounding shape mask output from the segmentator 160 and/or a real mask (hereinafter referred to as a "real mask") including a real boundary of an object in the input image. For example, the learning of the neural network system may be performed based on a value of each pixel of the real mask and/or a value of each pixel of the bounding shape mask. A difference between the two values may correspond to an error, and the convolutional neural network system 100 may be configured to learn using the segmentator 160 through backpropagation.

In some example embodiments of the present disclosure, a boundary of an object in the real mask used for learning may be thicker than a real boundary of the object. For example, the boundary of the object in the real mask may include a fake boundary and/or a false boundary encompassing the inside, the outside, or the inside and outside of the real boundary, as well as the real boundary. For example, pixel values of the real boundary of the real mask may be the same as pixel values of the fake boundary. Alternatively, a value of pixels of the fake boundary of the real mask may be smaller than a value of pixels of the real boundary.

In some example embodiments, performance of object detection (e.g., instance segmentation) may be experimentally observed by making a boundary thickness of the object of the real mask used for learning greater than a real boundary thickness of the object. This will be more fully described below.

Figure 2:
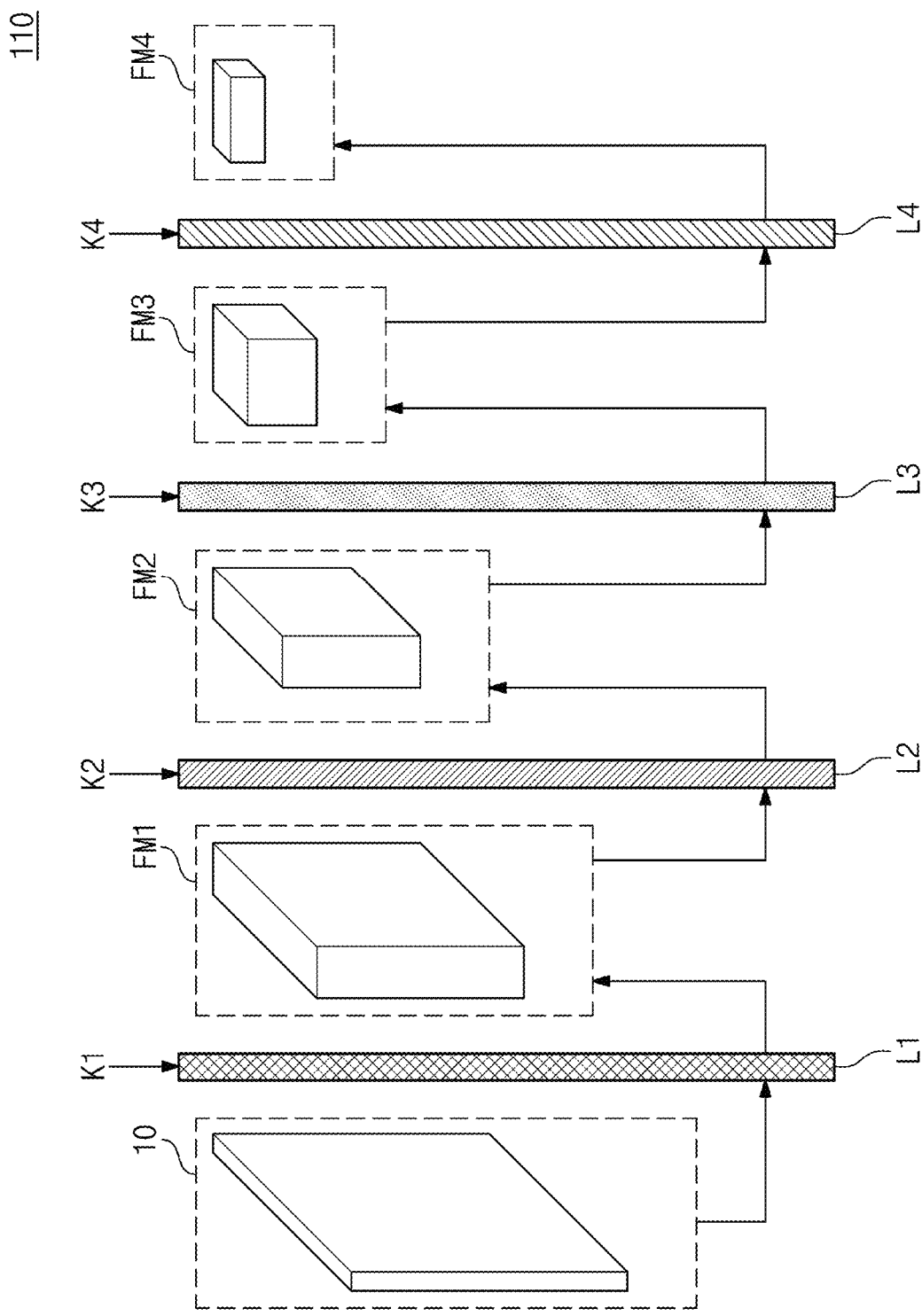
FIG. 2 illustrates an example configuration of a feature extractor of FIG. 1 according to some example embodiments.

FIG. 2 illustrates an example configuration of the feature extractor 110 of FIG. 1 in accordance with some example embodiments. The feature extractor 110 may include a plurality of layers L1 to L4 that are configured to repeatedly perform a convolution operation and/or a pooling operation.

In the example of FIG. 2, a first layer L1 may be configured to perform a convolution operation on an input image 10 by using a first kernel K1 and to output a first feature map FM1. For example, data of the input image 10 overlapping the first kernel K1 may be multiplied with a weight defined in the first kernel K1. The sum of multiplication values is output as one feature value. The multiplication and sum operations may be repeatedly performed, with the first kernel K1 sequentially shifted. As a result, a feature value corresponding to each position may be determined as the first kernel K1 is shifted. A set of feature values that are determined as the first kernel K1 is shifted may form the first feature map FM1. For example, in the case where the first kernel K1 includes a plurality of kernels, a first feature map FM1 may be generated which is composed of arrays, the number of which may correspond to the number of the kernels. The second layer L2 may be configured to perform a pooling operation on the first feature map FM1 by using a second kernel K2 and to output a second feature map FM2. In some example embodiments, in the second layer L2, sub-sampling (or down-sampling) for reducing the size of the first feature map FM1 may be performed. Pooling may be performed as an example of the sub-sampling. The pooling may include adjusting a width and/or a height of a channel while uniformly maintaining the number of channels on a spatial domain for the first feature map FM1. Afterwards, the third layer L3 may be configured to perform a convolution operation on the second feature map FM2 by using a third kernel K3 and/or to output a third feature map FM3, and/or the fourth layer L4 may be configured to perform a pooling operation on the third feature map FM3 by using a fourth kernel K4 and/or to output a fourth feature map FM4. Four layers are illustrated in FIG. 2 as an example, but the number of layers is not limited thereto. That is, the number of layers may be variously changed according to a type of a network that is used as a backbone of the feature extractor 110. A final feature map (i.e., FM4) may be input to the RoI extractor 120 (refer to FIG. 1) and the RoI aligner 130 (refer to FIG. 1).

Figure 3:
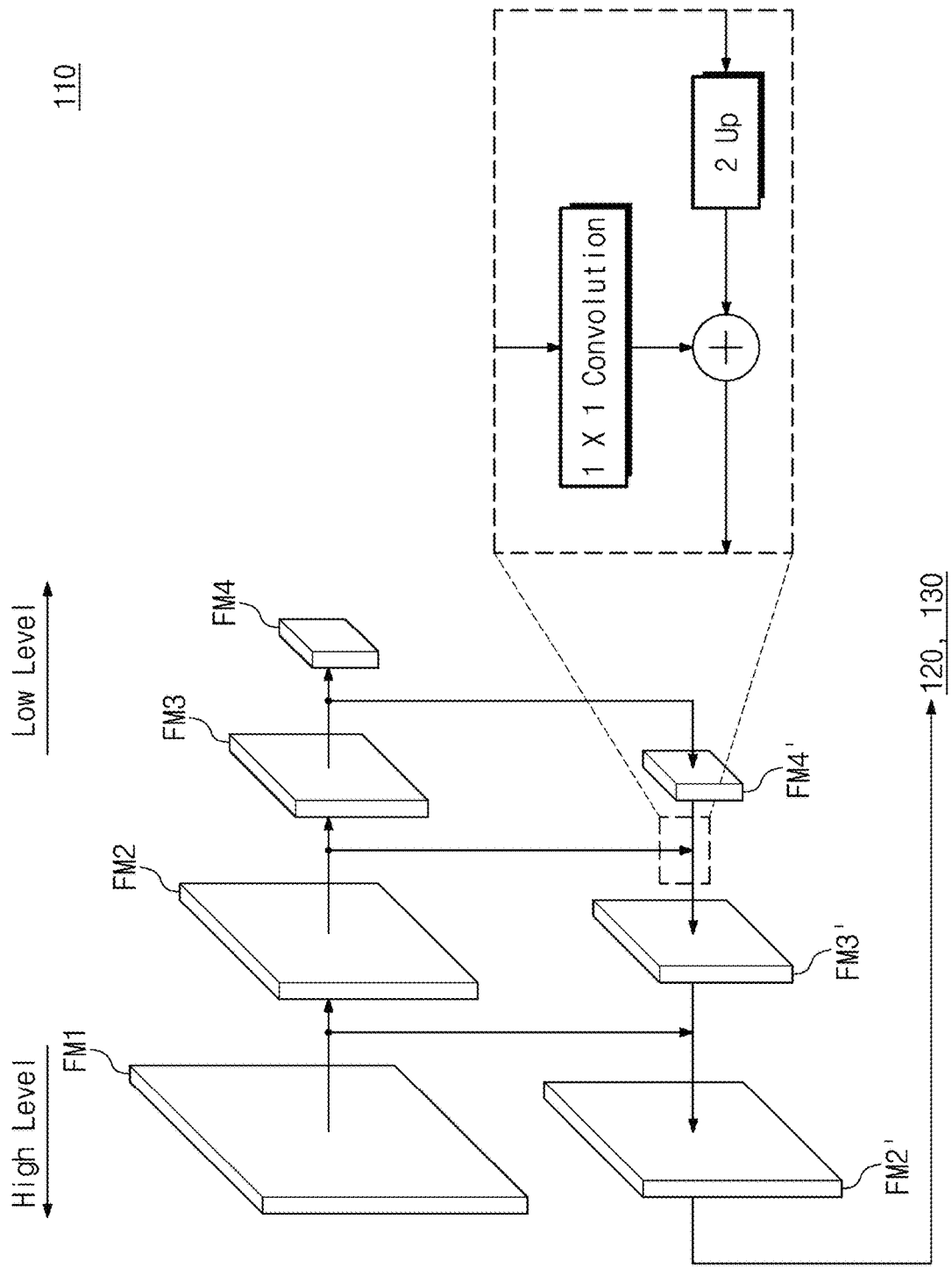
FIG. 3 illustrates an example configuration of a feature extractor of FIG. 1 according to some example embodiments.

FIG. 3 illustrates an example configuration of the feature extractor 110 of FIG. in accordance with some example embodiments 1. For brevity of illustration, the plurality of layers L1 to L4 (refer to FIG. 2) for performing a convolution operation and a pooling operation are not illustrated, and only feature maps FM1 to FM4 and FM1' to FM4' indicating operation results are illustrated. In the example of FIG. 3, a feature extractor 110 may be implemented as a feature pyramid network (FPN). In some example embodiments, instead of using only a final feature map of feature maps, the FPN may be used to extract a RoI more minutely, for example, based on a set of feature maps from a high-level feature map to a low-level feature map. In some examples, information may be lost from a feature map due to a plurality of convolution operations and/or a plurality of pooling operations. Therefore, instead of using only a low-level feature map, a feature map include a larger amount of information may be used through all or at least some feature maps of various levels. An element-wise product may be performed between a result of resizing the low-level feature map two times and a result of performing a 1×1 convolution operation on a high-level feature map. This operation may be repeatedly performed, for example, until a feature map of the highest level is targeted for the element-wise product. As a result, a feature map FM2' obtained at the highest level may be input to the RoI extractor 120 (refer to FIG. 1) and the RoI aligner 130 (refer to FIG. 1).

Figure 4:
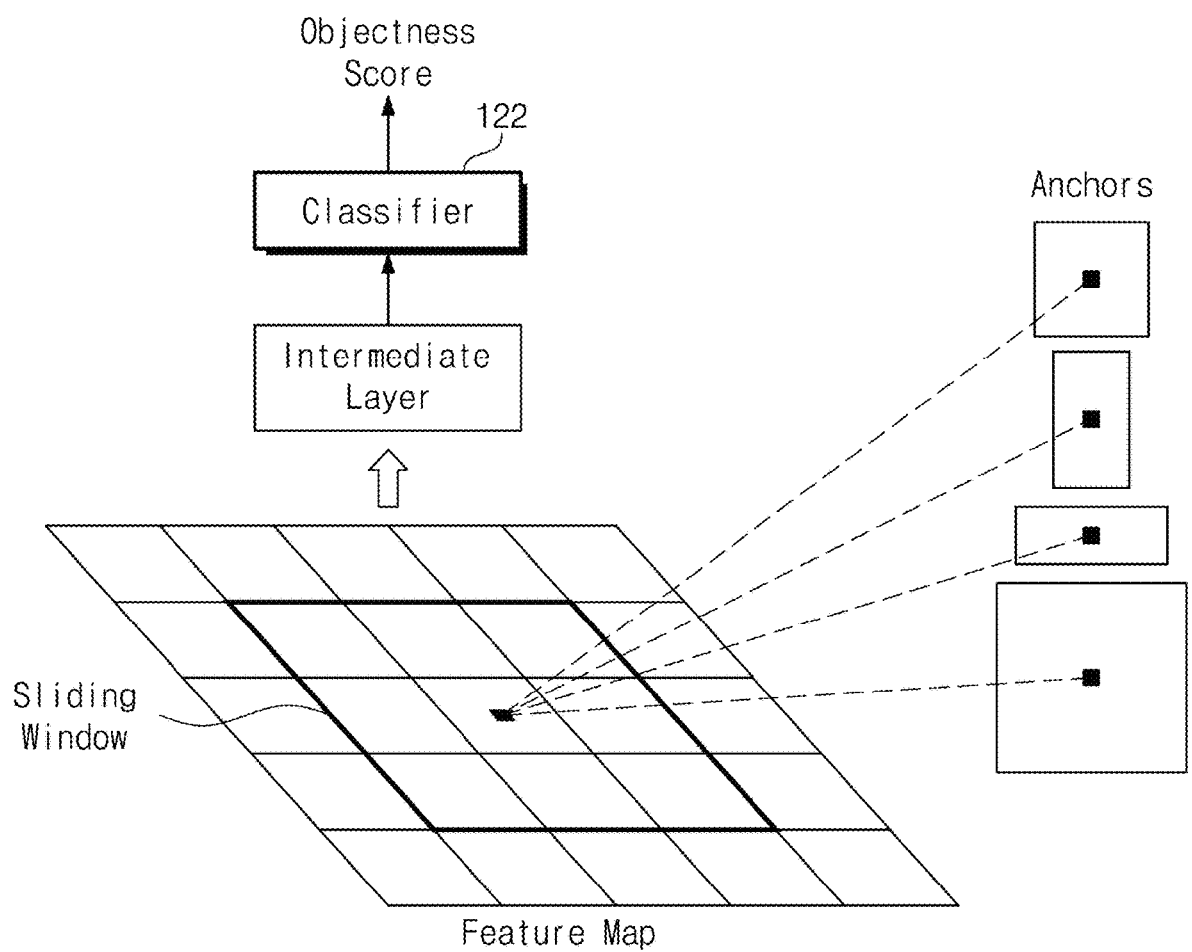
FIG. 4 conceptually illustrates an example operation of a RoI extractor of FIG. 1 according to some example embodiments.

FIG. 4 conceptually illustrates an example operation of the RoI extractor 120 of FIG. 1 in accordance with some example embodiments. As shown in FIG. 4, an RoI extractor 120 may be configured to determine a region in which an object may (e.g., is likely to) exist on a feature map. In some example embodiments, the RoI extractor 120 may include a classifier 122. The RoI extractor 120 may be configured to scan a feature map, for example, by using a sliding window (e.g., a 3×3 size as illustrated in FIG. 4), and/or to map the scanned region with a specific size (e.g., a lower dimension). As a result of the mapping, the RoI extractor 120 may be configured to perform as an intermediate layer. At each sliding window position, the classifier 122 may be configured to generate regions in which an object may exist (e.g., a region where an object is likely to exist, that is, a region proposals), based on a plurality of anchors. That is, the classifier 122 may be configured to determine an "objectness score," which may indicate whether the searched region includes an object, and/or to output at least one RoI among searched regions based on a given reference. The at least one RoI that is output from the classifier 122 may be input to the RoI aligner 130. In some example embodiments, the classifier 122 may be implemented with, but is not limited to, a 1×1 convolution layer.

Figure 5:
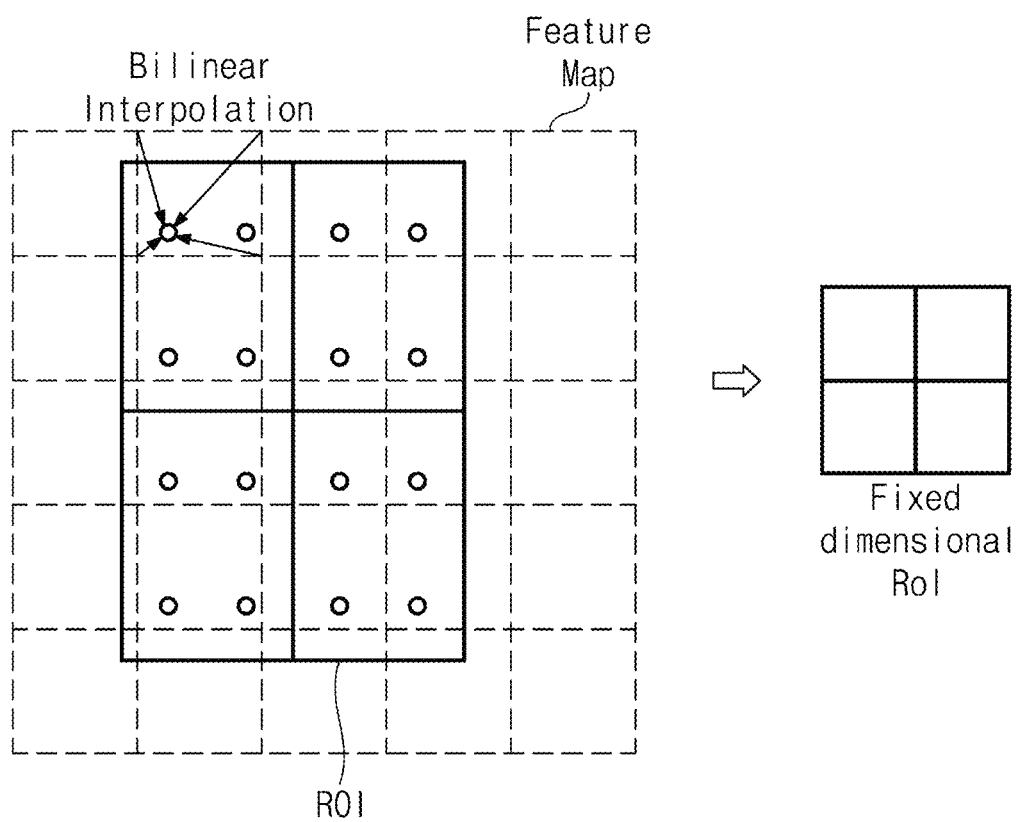
FIG. 5 conceptually illustrates an example alignment by a RoI aligner of FIG. 1 according to some example embodiments.

FIG. 5 conceptually illustrates an example alignment by the RoI aligner 130 of FIG. 1 in accordance with some example embodiments. As shown in FIG. 5, the case of extracting RoIs from a feature map by using RoI pooling, a bounding box of a real value may be predicted. In this example, a loss of information may occur in the process of changing the real value to an approximate integer value for each pixel. For example, in the case of pooling a feature map of a 5×5 size to a feature map of a 2×2 feature map, loss of information may occur due to pooling sizes that are different from each other. In this case, linear interpolation may be used to prevent ro reduce the loss from occurring in the RoI pooling process. In some example embodiments, in the case where a RoI of a real value is predicted, the RoI aligner 130 may be configured to utilize some or all values of corresponding pixels, for example, without changing the real value to an approximate integer value. As a result, some or all pixel values of a feature map are applied to a RoI, and thus, the accuracy of the RoI may be improved.

Figure 6:
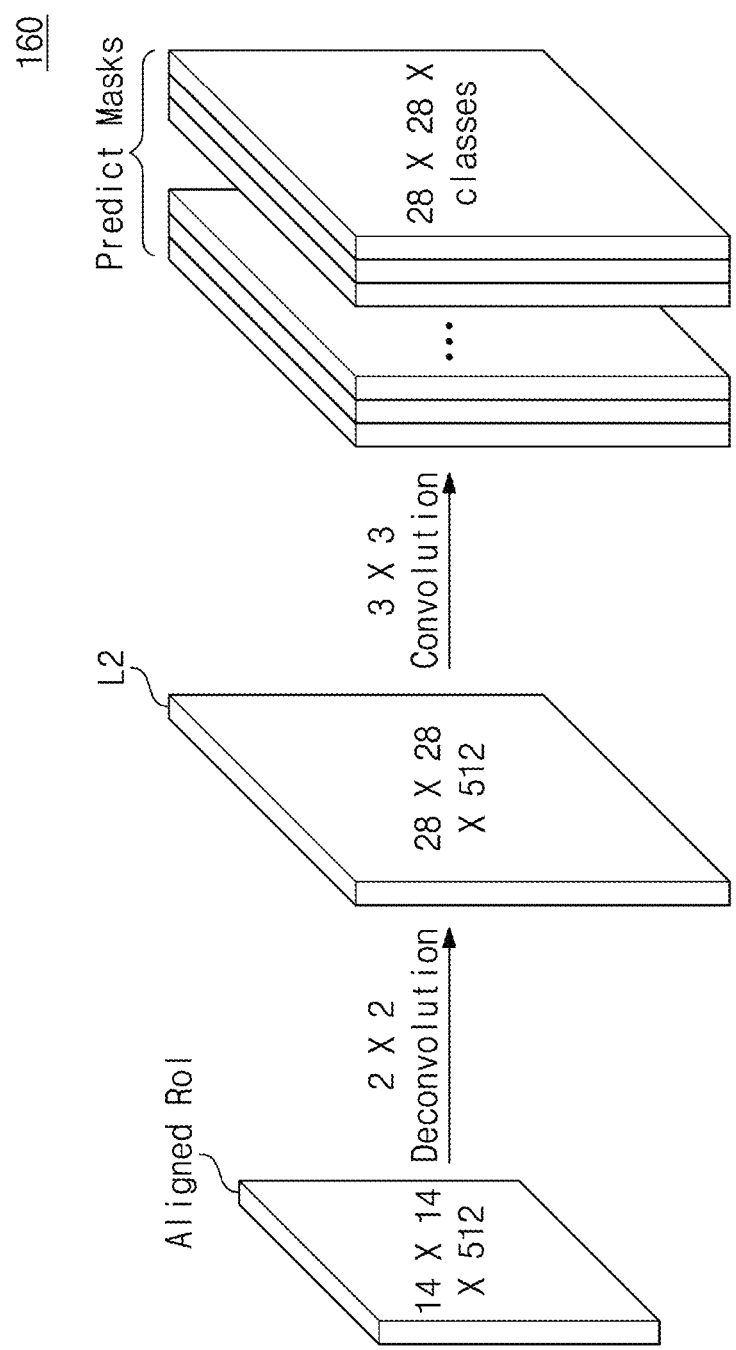
FIG. 6 illustrates an example configuration of a segmentator of FIG. 1 according to some example embodiments.

FIG. 6 illustrates an example configuration of the segmentator 160 of FIG. 1 in accordance with some example embodiments. In the example of FIG. 6, a segmentator 160 is configured to generate a mask to predict a contour of an object. The segmentator 160 may include a neural network that is configured to perform a convolution operation and/or a deconvolution operation on a RoI, which may be cropped and/or resized by the RoI aligner 130. In the example embodiment in FIG. 6, the segmentator 160 performs a 2×2 deconvolution operation and a 3×3 convolution operation.

In some example embodiments, the segmentator 160 may be configured to adjust a size of an aligned RoI, which may facilitate further processing of the neural network system based on a predicted mask and a real mask. In some example embodiments, the segmentator 160 may be configured to generate feature maps having a size of 28×28×512 by performing the deconvolution operation on aligned RoIs each having a size of 14×14×512. In some example embodiments, the segmentator 160 may be configured to generate a plurality of predicted masks by performing a 3×3 convolution operation on feature maps each having the size of 28×28×512.

In some example embodiments, a plurality of predicted masks may include information related to the probability that each object belongs to each class. For example, each predicted mask may include 28×28 pixel values and/or a value indicating the probability that each pixel belongs to a specific class. A convolutional neural network system may be configured to learn the segmentator 160 based on pixel values of the predicted mask, pixel values of the real mask, and a difference of the pixel values (e.g., error information). This will be described below.

FIG. 7 illustrates an example general real mask (e.g., a bounding shape mask) that may be used with a predicted mask output from the segmentator 160 in some example embodiments. In the example of FIG. 7, a bounding shape mask is composed of 10×18 pixels. A pixel that is marked by "1" may correspond to a real boundary of an object, and a pixel that is marked by "0" may correspond to a region except for a contour. In this example, a predicted mask output from the segmentator 160 may not be accurately matched with a bounding shape mask. Accordingly, the segmentator 160 may learn based on pixel values of two masks. However, in some examples, a real boundary marked by "1" may be very thin, and a value may sharply or drastically change between a pixel that is marked by "1" and a pixel that is marked by "0". This may cause an increase in the difficulty of learning.

FIG. 8 illustrates an example real mask that may be used with a predicted mask, according to some example embodiments of the present disclosure. The real mask illustrated in FIG. 8 includes an inner fake boundary and an outer fake boundary, in addition to a real boundary of an object. As a result, a contour of the object of the real mask may be thicker than a contour of an object of a predicted mask. In this respect, the real mask illustrated in FIG. 8 may be called a "thick bounding shape mask." Because the thickness of the contour of the thick bounding shape mask in FIG. 8 is thicker than the contour of the predicted mask, even though a little error is present between the predict mask and the thick bounding shape mask, it may be possible to learn the segmentator 160 more efficiently.

FIGS. 9 and 10 illustrate examples of thick bounding shape masks that may be used with a predicted mask, according to some example embodiments of the present disclosure. First, a thick bounding shape mask of FIG. 9 includes an inner fake boundary that is adjacent to an inner side of a real boundary of an object. In contrast, a thick bounding shape mask of FIG. 10 includes an outer fake boundary that is adjacent to an outer side of the real boundary of the object.

FIG. 11 illustrates an example real mask that may be used with a predicted mask, according to some example embodiments of the present disclosure. In the example of FIG. 11, a thick bounding shape mask is similar to a thick bounding shape mask of FIG. 8 in that the thick bounding shape mask may include an inner fake boundary and an outer fake boundary. However, only pixels corresponding to a real boundary of an object may have a value of 1, and pixels of the inner fake boundary and the outer fake boundary may have a value smaller than 1. In this respect, the real mask illustrated in FIG. 11 may be called a "scored bounding shape mask." The example of FIG. 11 is illustrated as the pixels of the inner fake boundary and the outer fake boundary have a value of 0.9, but some example embodiments of some inventive concepts may not be not limited thereto.

In some examples, a pixel value of a real mask of an object and a pixel value of a fake boundary may be differently set. For example, even though a real boundary of an object of a real mask may not be completely matched with a contour of an object of a predicted mask, like the embodiment of FIG. 7, in the case where pixel values are uniformly set to "1," an error may not be applied properly for learning. Therefore, permitting a little difference between a real boundary of an object in a thick bounding shape mask and a contour of an object in a predicted mask may facilitate learning in an example where a penalty is applied based on the difference.

Figure 12:
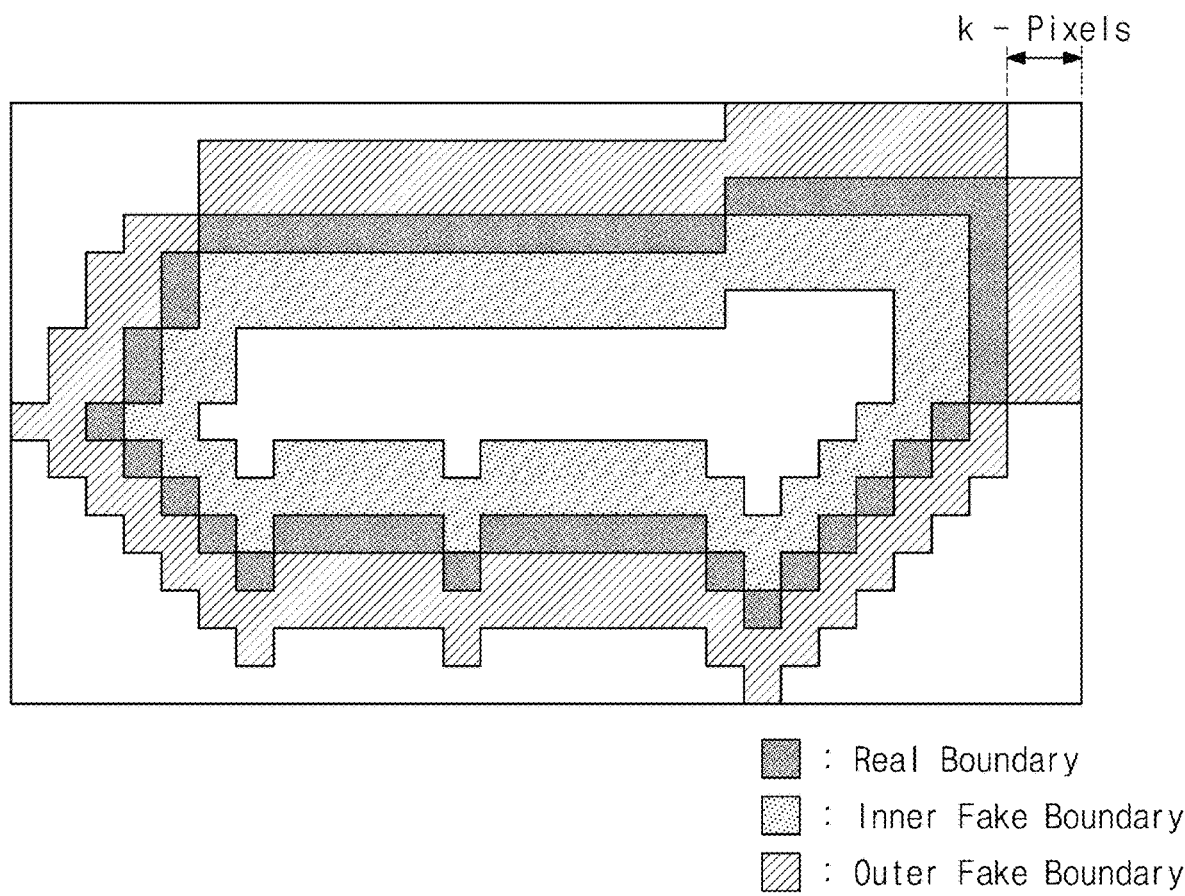
FIG. 12 illustrates an example thick bounding shape mask that may be used with a predicted mask, according to some example embodiments of the present disclosure.

FIG. 12 illustrates an example thick bounding shape mask that is used with a predicted mask, according to some example embodiments of the present disclosure. In the example of FIG. 12, a mask is similar to the mask in the example of FIG. 8. However, a thickness of an inner fake boundary may correspond to a plurality of pixels. Likewise, a thickness of an outer fake boundary may correspond to a plurality of pixels. An example embodiment is illustrated as a thickness of a fake boundary that corresponds to a thickness that is defined by two pixels.

Figure 13:
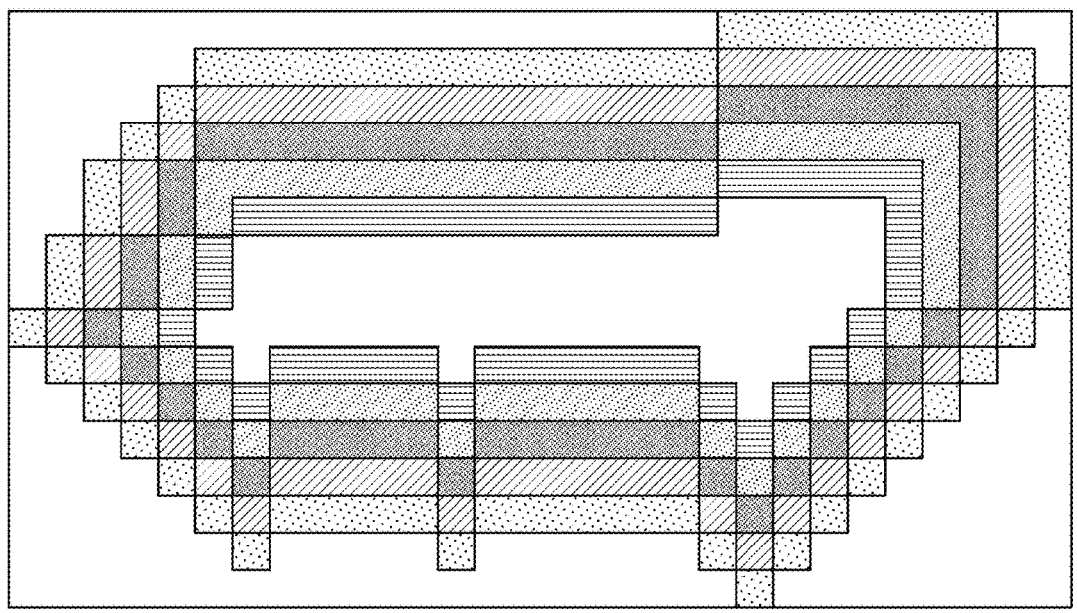
FIG. 13 illustrates an example scored bounding shape mask that may be used with a predicted mask, according to some example embodiments of the present disclosure.

FIG. 13 illustrates an example scored bounding shape mask that may be used with a predicted mask, according to some example embodiments of the present disclosure. In the example of FIG. 12, a mask is similar to the mask of FIG. 11. However, a first inner fake boundary and a second inner fake boundary are provided inside a real boundary of an object. Also, a first outer fake boundary and a second outer fake boundary are provided outside the real boundary of the object. In some example embodiments, pixels of the real boundary of the object may have a value of 1. In some example embodiments, pixels of the first inner fake boundary and the first outer fake boundary may have a value of 0.9. In some example embodiments, pixels of the first outer fake boundary and/or the second inner fake boundary may have a value of 0.8. That is, as a distance from the real boundary increases, a pixel value may become smaller. However, the number of provided fake boundaries and/or values of pixels constituting each boundary are not limited to examples such as FIG. 13.

FIG. 14 illustrates an example general real mask (e.g., a bounding box mask) that may be used with a predicted mask output from a segmentator. In some example embodiments, a bounding box mask may be composed of 10×18 pixels. Pixels may be marked by "1" that correspond to a box encompassing a real boundary of an object in the form of a rectangle, and pixels may be marked by "0" that correspond to a region except for the box.

FIG. 15 illustrates an example real mask that may be used with a predicted mask, according to some example embodiments of the present disclosure. In the example of FIG. 15, a real mask includes an inner fake box and an outer fake box, in addition to a real boundary of an object. As a result, a box encompassing a contour of the object of the real mask may be thicker than a box encompassing an object of a predicted mask. In this respect, the real mask illustrated in FIG. 15 may be called a "thick bounding box mask," Because the thickness of the thick bounding box mask in the example of FIG. 15 is greater than the thickness of the box of the object of the predicted mask, even though a little error is present between the predicted mask and a thick real mask, it may be possible to learn the segmentator 160 more efficiently.

Figure 16:
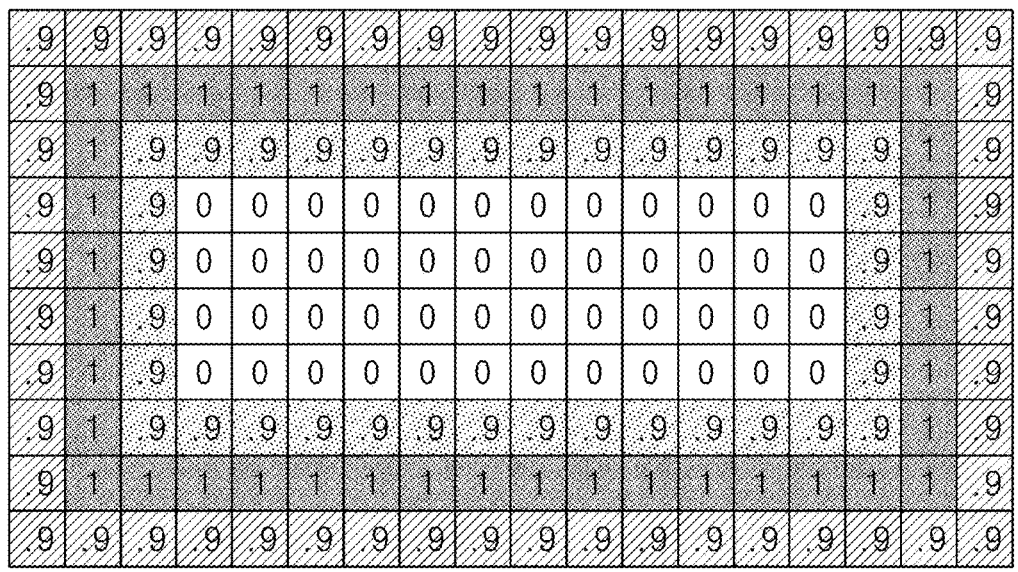
FIG. 16 illustrates an example real mask that may be used with a predicted mask, according to some example embodiments of the present disclosure.

FIG. 16 illustrates an example real mask that may be used with a predicted mask, according to some example embodiments of the present disclosure. In the example of FIG. 16, a real mask includes an inner fake boundary and an outer fake boundary, which are composed of pixels having a value of 0.9, in addition to a real boundary composed of pixels having a value of 1. In this respect, the mask in the example of FIG. 16 may be called a "scored bounding box mask." The mask in the example of FIG. 16 is similar to the mask of FIG. 12 except that a boundary is in the form of a rectangular box, and thus, additional description will be omitted to avoid redundancy. In addition, although not illustrated in drawings, various shapes of bounding box masks may be used. In some example embodiments, as in the thick bounding shape mask of FIG. 9, a bounding box mask including an inner fake boundary may be used for learning. In some example embodiments, as in the thick bounding shape mask of FIG. 10, a bounding box mask including an outer fake boundary may be used for learning.

In some example embodiments, as in the thick bounding shape mask of FIG. 12, a bounding box mask may be used for learning that includes a fake boundary, where the thickness of which is defined by a plurality of pixels. In some example embodiments, as in the scored bounding shape mask of FIG. 13, a bounding box mask including a plurality of fake boundaries may be used for learning, and pixel values of the plurality of fake boundaries may become smaller as a distance of the pixel from a real boundary of an object increases.

Figure 17:
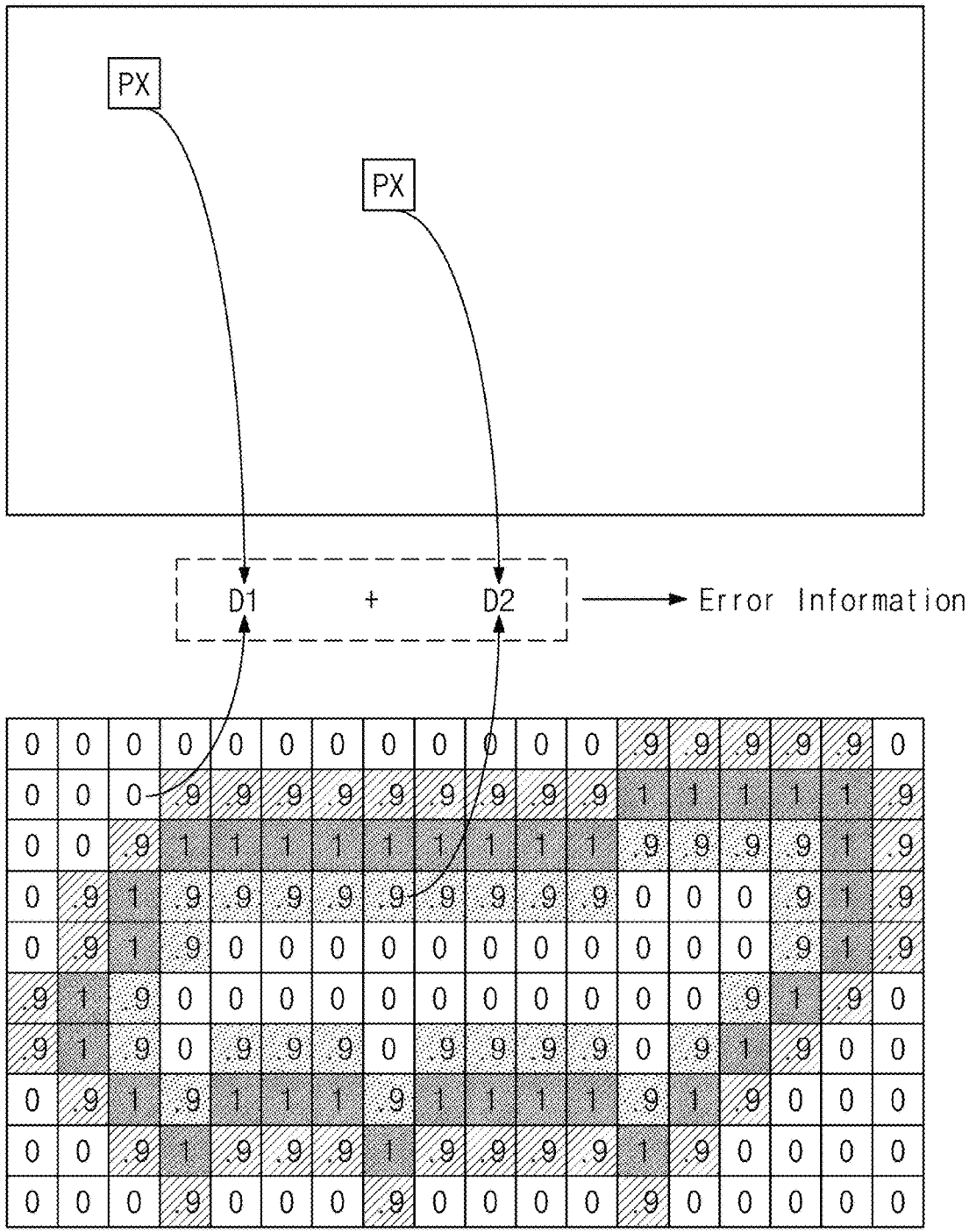
FIG. 17 conceptually illustrates an example of how a convolutional neural network system may use a predicted mask and a scored bounding shape mask, according to some example embodiments of the present disclosure.

FIG. 17 conceptually illustrates an example of how a convolutional neural network system may use a predicted mask and a scored bounding shape mask, according to some example embodiments of the present disclosure. In the example of FIG. 17, a convolutional neural network system 100 (such as the example embodiment of FIG. 1) may determine and/or learn a boundary of an object in an image based on a value of each pixel of a predicted mask and a value of each pixel of a scored bounding shape mask. In the case where a value of any pixel of the predicted mask is the same as or similar to a value of a corresponding pixel of the scored bounding shape mask (for example, where a difference of the values is within an error threshold), it may be determined that the corresponding pixel of the predicted mask outputs an accurate prediction value. In contrast, in the case where a difference between a value of any pixel of the predicted mask and a value of a corresponding pixel of the scored bounding shape mask is great (for example, where a difference of the values is beyond an error threshold), it may be determined that the prediction is incorrect.

As further shown in the example of FIG. 17, the convolutional neural network system 100 may be configured to generate error information based on the difference between the two pixels. For example, the convolutional neural network system 100 may be configured to determine differences between all pixels of the predicted mask and all corresponding pixels of the scored bounding shape mask. FIG. 17, in particular, illustrates a difference D1 between pixel values at the second row and third column and a difference D2 between pixel values at the fourth row and eighth column. In some example embodiments, the convolutional neural network system 100 may be configured to determine differences based on a resolution (i.e., 10×18) of a mask and/or to sum the differences. A final value of the sum of the differences may be used as error information and/or may be used to learn one or more components of the convolutional neural network system, such as the RoI aligner 130 (refer to FIG. 1), the classifier 140 (refer to FIG. 1), the bounding box regressor 150 (refer to FIG. 1), the segmentator 160 (refer to FIG. 1), etc. In some example embodiments, where the final value of the sum of the differences is very great (for example, beyond an error sum threshold), to prevent or reduce a great deviation of an output value from occurring in learning, learning may be based on a value that is obtained by dividing the final value of the sum by the number of pixels.

Figure 18:
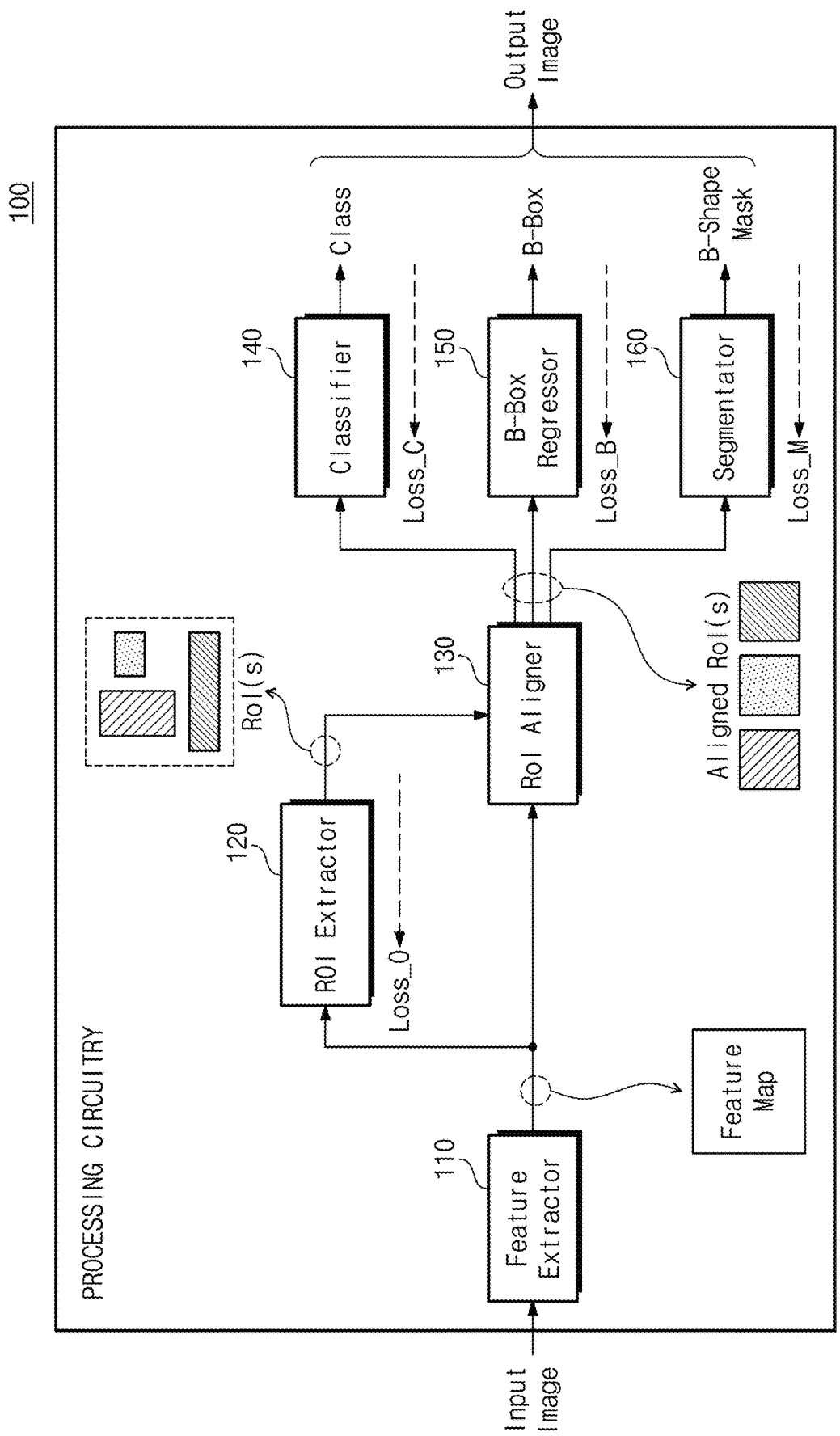
FIG. 18 schematically illustrates an example learning processor of a convolutional neural network system according to some example embodiments of the present disclosure.

FIG. 18 schematically illustrates an example learning process of a convolutional neural network system 100 according to some example embodiments of the present disclosure. In the example of FIG. 18, error information that is obtained using the predicted mask and the bounding shape mask, such as described with reference to FIG. 17, may be provided to a front stage of the convolutional neural network system 100. Some example embodiments may utilize the error information for learning, such as backpropagation. For example, the loss in training may include four losses, and the convolutional neural network system 100 may be learned by a sum of the four losses. For example, in FIG. 18, "LossxO" may be associated with "Objectness Score" output by the RoI extractor 120, "LossxC" may be associated with a class output by the RoI classifier 140, "LossxB" may be associated with position information of an object output by the bounding box regressor 150, and "LossxM" may be associated with a bounding shape output by the segmentator 160, and the convolutional neural network system 100 may be learned by a sum of the four losses described above.

Figure 19:
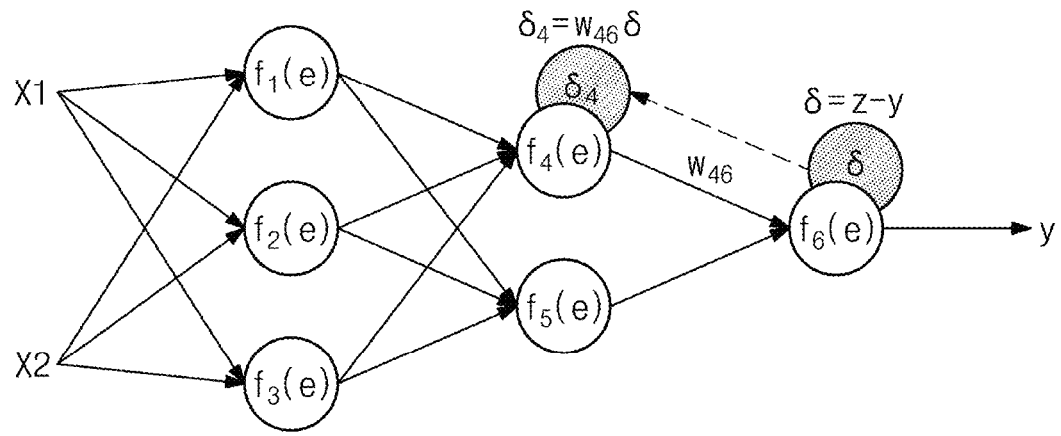
FIGS. 19 and 20 illustrate conceptually an example process in which backpropagation used to learn a convolutional neural network system is executed according to some example embodiments.
Figure 20:
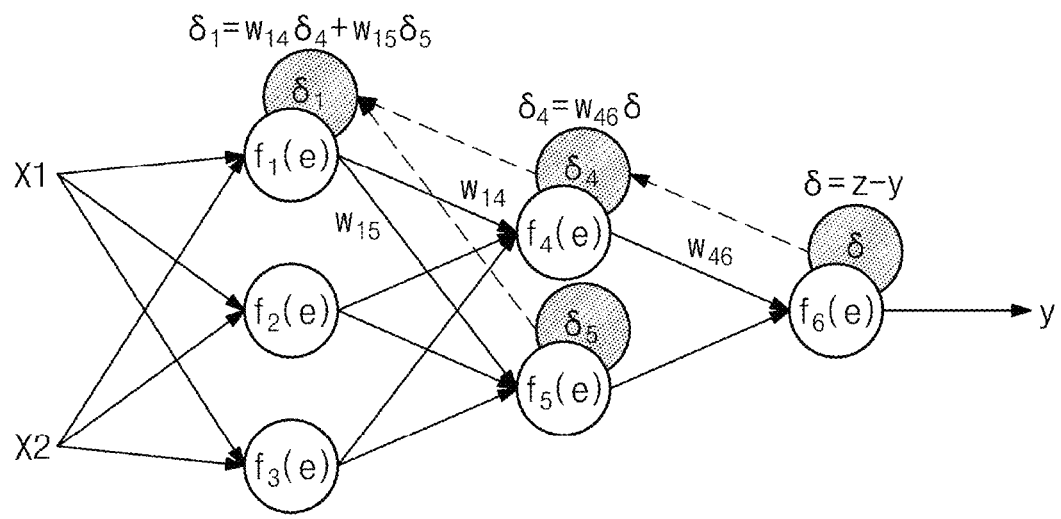

FIGS. 19 and 20 illustrate conceptually an example process in which backpropagation used to learn the convolutional neural network system 100 is executed. Referring to FIGS. 18 and 19 together, learning for the convolutional neural network system 100 may include feed-forward prediction and backpropagation. For example, feed-forward prediction may correspond to a process of inputting an input image to the convolutional neural network system 100 and generating a predicted mask (e.g., a bounding shape mask output from the segmentator 160). In the example of FIG. 19, a convolutional neural network system 100 may be configured to determine an error δ corresponding to a difference between a pixel value y of the predicted mask and a pixel value z of a scored bounding shape mask. In some examples, a convolutional neural network system 100 that may not be sufficiently learned may result in values of the error δ that may be great (e.g., beyond an error threshold). In contrast, in some examples, a convolutional neural network system 100 that is sufficiently learned may result in values of the error δ that may be small (e.g., within an error threshold). The convolutional neural network system 100 may be configured to obtain δ4, for example, by using the obtained error δ and may obtain δ5 in a similar manner as illustrated in FIG. 20. The convolutional neural network system 100 may be configured to update a weight and a bias value while backpropagating the obtained error δ. As the convolutional neural network system 100 repeatedly performs the above processes, a weight and/or a bias may be changed to a value optimized for training data (x1, x2). However, in some example embodiments, a different way to learn the convolutional neural network system 100 may be utilized; for example, various ways to update a weight and/or a bias, such as using a value obtained by performing partial differential on a sigmoid function, may be adopted.

Figure 21:
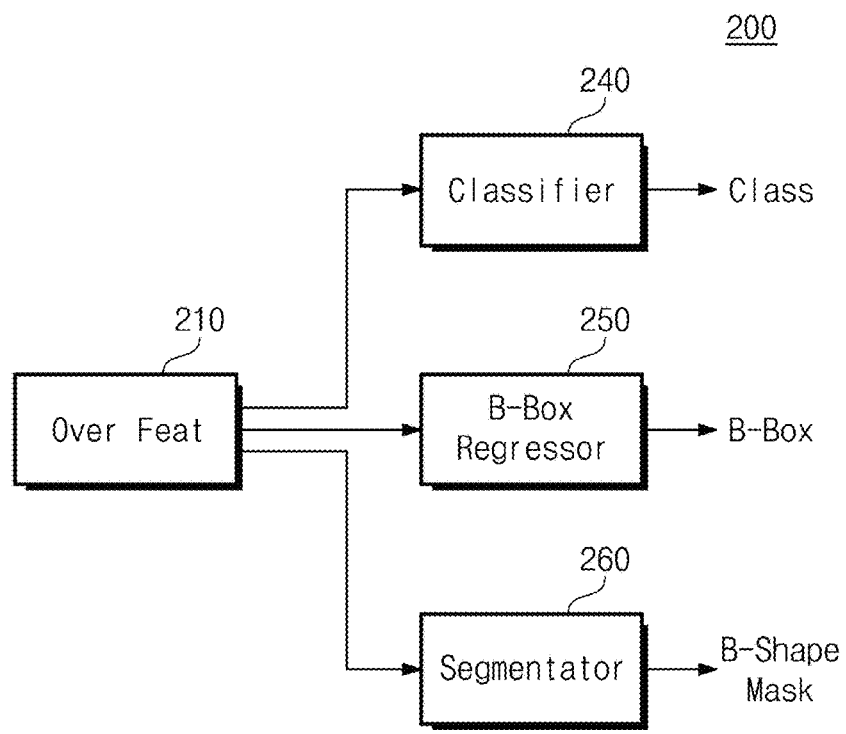
FIG. 21 illustrates an example configuration of a convolutional neural network system according to some example embodiments of the present disclosure.

FIG. 21 illustrates an example configuration of a convolutional neural network system 200 according to some example embodiments of the present disclosure. In the example of FIG. 21, a convolutional neural network system 100 described with reference to FIGS. 1 to 20 may be based on the Mask R-CNN, and/or the convolutional neural network system 200 may be based on OverFeat. The OverFeat architecture may be implemented with a network that scans an input image in a sliding window manner and extracts feature maps. Additional details of a configuration and an operation of the OverFeat architecture are omitted. The convolutional neural network system 200 may be configured to extract class and/or position information of an object, for example, by using a classifier 240 and/or a bounding box regressor 250, and/or to (for example, simultaneously, concurrently, and/or consecutively) generate a bounding shape mask encompassing a contour of the object as determined by a segmentator 260. A real mask that is used to learn the convolutional neural network system 200 may include masks described with reference to FIGS. 8 to 13, 15, and 16 and/or modified versions of the masks.

Figure 22:
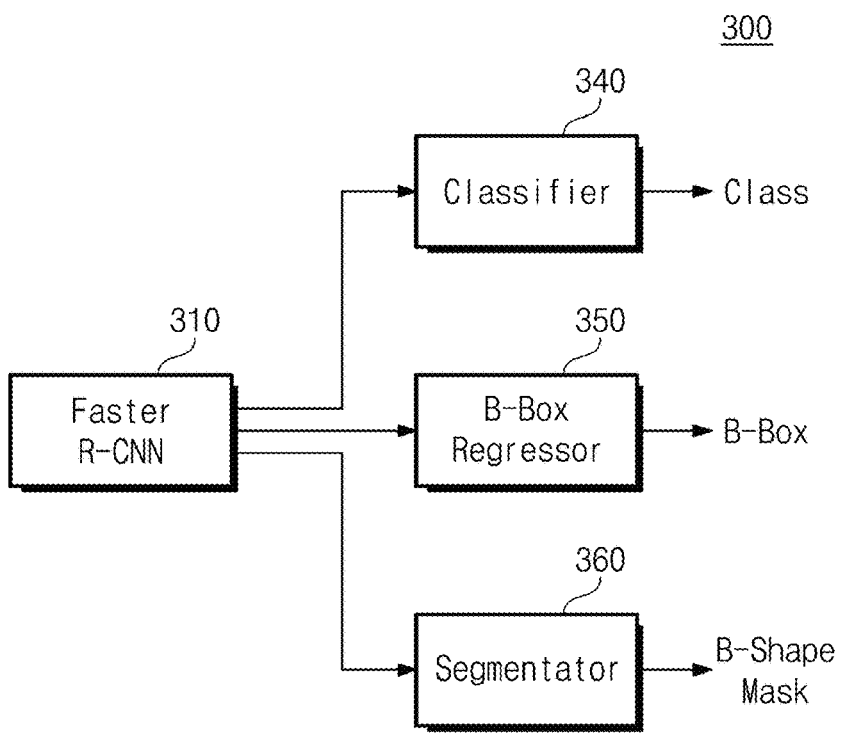
FIG. 22 illustrates an example configuration of a convolutional neural network system according to some example embodiments of the present disclosure.

FIG. 22 illustrates an example configuration of a convolutional neural network system 300 according to some example embodiments of the present disclosure. In the example of FIG. 22, a convolutional neural network system 300 may be based on Faster R-CNN. The Mask R-CNN that is described in the specification is based on the Faster R-CNN. Details of a configuration and an operation of the Faster R-CNN are omitted. The convolutional neural network system 300 may be configured to perform classification using a classifier 340 and/or regression using a bounding box regressor 350 and/or may (for example, simultaneously, concurrently, and/or consecutively) generate masks (e.g., the masks described with reference to FIGS. 8 to 13, 15, and 16, or modified versions of the masks) used to learn a bounding shape mask as determined by a segmentator 360.

Figure 23:
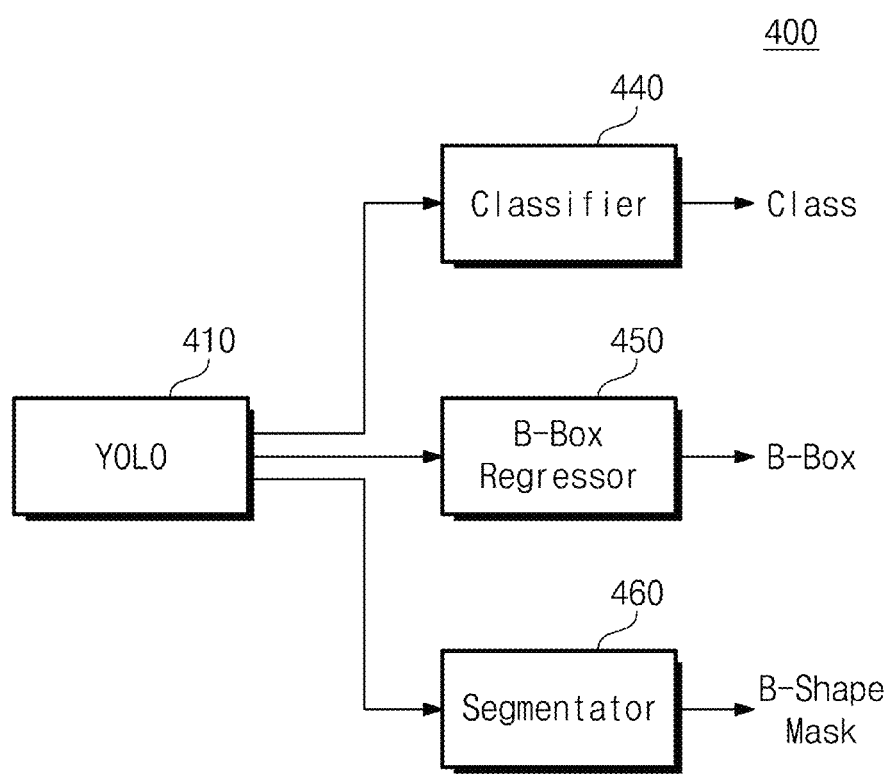
FIG. 23 illustrates an example configuration of a convolutional neural network system according to some example embodiments of the present disclosure.

FIG. 23 illustrates an example configuration of a convolutional neural network system 400 according to some example embodiments of the present disclosure. In the example of FIG. 23, a convolutional neural network system 400 may be based on YOLO (You Only Look Once). The YOLO may be configured to scan an image in a sliding window manner by using a plurality of anchors and/or generate a feature map. In some example embodiments, the YOLO may not include the RoI extractor 120 (refer to FIG. 1). Details of a configuration and an operation of the YOLO are omitted. The convolutional neural network system 400 may be configured to perform classification and/or regression and/or may (e.g., simultaneously, concurrently, and/or consecutively) generate a bounding shape mask.

Figure 24:
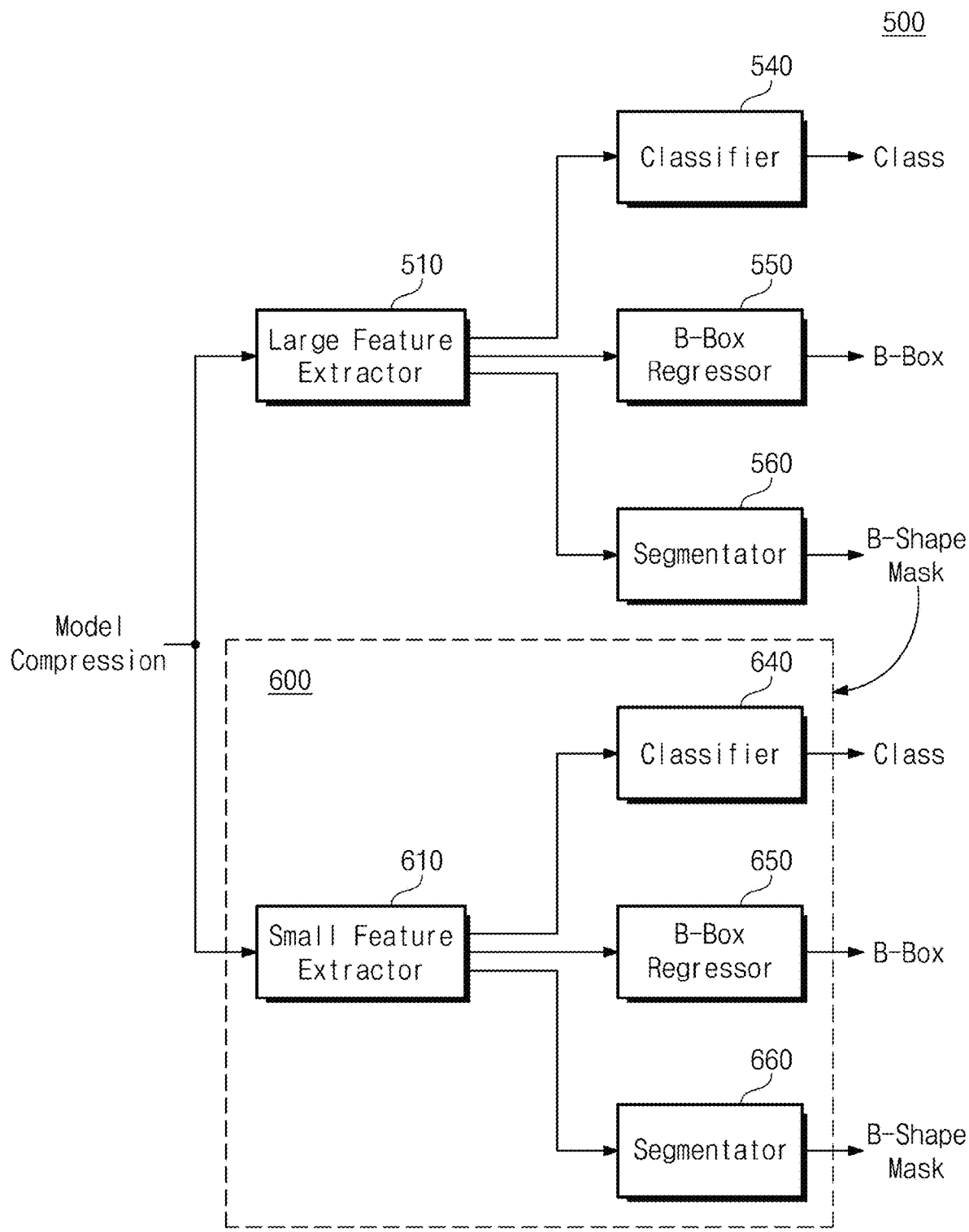
FIG. 24 illustrates an example configuration of a convolutional neural network system according to some example embodiments of the present disclosure.

FIG. 24 illustrates an example configuration of convolutional neural network systems 500 and/or 600 according to some example embodiments of the present disclosure. In the example of FIG. 24, a first convolutional neural network system 500 includes a computationally dense (or fine) network such as ResNet, and/or the second convolutional neural network system 600 may include a computationally conservative (or less fine) network such as MobileNet. Therefore, learning and object detection by the second convolutional neural network system 600 may be less fine and/or computationally intensive than learning and object detection by the first convolutional neural network system 500. In some example embodiments, the first and second convolutional neural network systems 500 and 600 may constitute model compression. That is, a learning result determined and/or provided by the first convolutional neural network system 500 may be used to learn the second convolutional neural network system 600. For example, the first convolutional neural network system 500 may be configured to provide the second convolutional neural network system 600 with various information for learning as determined by a segmentator 560. In some example embodiments, the learning result of the first convolutional neural network system 500 may be used to conduct supervised learning for the second convolutional neural network system 600. In some example embodiments, the second convolutional neural network system 600 that is generated by supervised learning using the learning result of the first convolutional neural network system 500 may be ported to a mobile device, etc.

Figure 25:
FIG. 25 illustrates an example of object detection by a convolutional neural network system that may be learned based on a bounding box mask according to some example embodiments of the present disclosure.

FIG. 25 illustrates object detection by convolutional neural network systems that are learned based on a bounding box mask according to some example embodiments of the present disclosure. In an example embodiment, ResNet101 was used as the backbone of the feature extractor 110 (refer to FIG. 1), and object detection was performed on a MS COCO val data set. In many object recognition systems, detection for a very small object in an image may be difficult or inaccurate, but some example embodiments of the present disclosure may be capable of detecting small objects in an image, such as shown in FIG. 25.

Table 1 below shows a test result of a bounding shape mask of the present disclosure with regard to MS COCO minval based on the example convolutional neural network discussed with respect to FIG. 25. In Table 1, "R" indicates ResNet, "X" indicates ResNeXt, and "Inst. mask" indicates a bounding box mask in accordance with some example embodiments of the present disclosure. It may be observed from Table 1 that the highest scores were obtained in all fields upon performing object detection by using a bounding shape box of the present disclosure. In particular, higher scores were obtained in all fields than for a ResNeXt neural network that uses a same or similar backbone. That is, it is observed that the performance of object detection may be improved by performing learning while adjusting a boundary thickness of an object in a real mask, without changing an algorithm of an existing convolutional neural network system.

ranges of detectable wavelengths. Examples of such uses include, for instance, identifying individuals and individual biometric features in a biometric authentication system; object focusing in a camera; identification of objects in extended reality presentations, such as augmented reality and virtual reality applications; and three-dimensional modeling, such as for digital animation and manufacturing via three-dimensional printing. As a second example, such a neural network system 100 may utilize object detection, location, and/or classification as a part of a machine vision system of an autonomous vehicle, for example, to identify, locate, and/or classify objects such as other vehicles, bicycles, pedestrians, traffic signals and markers, and

TABLE 1

| Model | backbone | $AP_{bb}$ | $A_{bb}^{50}$ | $A_{bb}^{75}$ | $A_{bb}^{L}$ | $A_{bb}^{M}$ | $A_{bb}^{S}$ | $AP_{mk}$ | $AP_{mk}^{50}$ | $AP_{mk}^{75}$ | $AP_{mk}^{L}$ | $AP_{mk}^{M}$ | $AP_{mk}^{S}$ |
|---|---|---|---|---|---|---|---|---|---|---|---|---|---|
| Mask R-CNN | R-50 | 37.8 | 58.0 | 38.3 | 50.2 | 41.1 | 20.1 | 33.6* | 55.2* | 35.3* | 53.5 | 39.9 | 16.9 |
| +deeper | R-101 | 39.7* | 60.3* | 41.7* | 53.1 | 43.5 | 22.4 | 35.4* | 57.3* | 37.5* | 55.7 | 41.2 | 18.2 |
| +ResNeXt | X-101 | 39.6* | 61.5* | 43.2* | 53.8 | 44.0 | 23.6 | 36.7* | 59.5* | 38.9* | 56.8 | 42.1 | 19.1 |
| Faster R-CNN | R-50 | 35.9 | 57.4 | 35.1 | 48.0 | 39.2 | 17.3 | — | — | — | — | — | — |
| +S-Bshape | R-50 | 40.7 | 62.6 | 42.7 | 52.8 | 43.4 | 28.9 | 37.4 | 56.6 | 36.9 | 50.1 | 40.2 | 21.9 |
| +deeper | R-101 | 44.9 | 69.9 | 49.4 | 60.8 | 50.4 | 28.9 | 39.0 | 58.7 | 39.1 | 52.3 | 42.6 | 22.2 |
| +ResNeXt | X-101 | 45.3 | 70.3 | 49.8 | 61.3 | 50.8 | 29.2 | 39.5 | 59.6 | 40.0 | 52.6 | 42.9 | 23.0 |
| +Inst. mask | X-101 | 45.5 | 70.5 | 49.9 | 61.5 | 50.9 | 29.5 | 40.1 | 61.9 | 41.5 | 56.9 | 43.6 | 23.7 |

Figure 26:
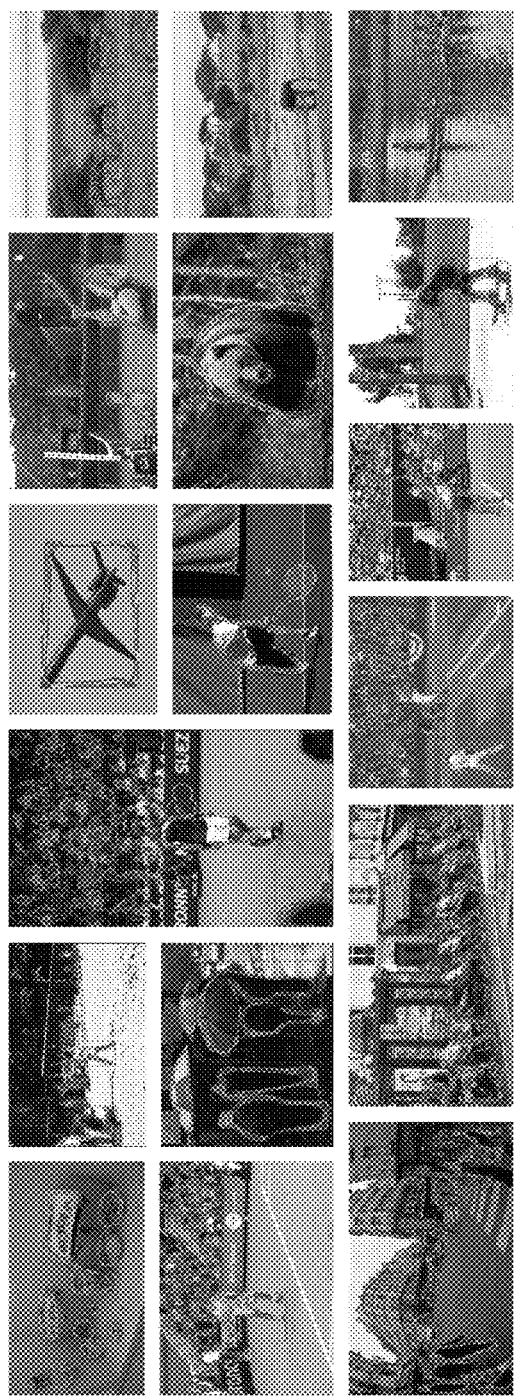
FIG. 26 illustrates an example of object detection by a convolutional neural network system that is learned based on a bounding shape mask according to some example embodiments of the present disclosure.

FIG. 26 illustrates object detection by a convolutional neural network system that is learned based on a bounding shape mask according to an exemplary embodiment of the present disclosure. In an example embodiment, ResNet101 was used as the backbone of the feature extractor 110 (refer to FIG. 1), and object detection was performed on a MS COCO val data set. In general, detection for a very small object in an image may not be difficult. However, as shown in FIG. 26, some convolutional neural network systems in accordance with some example embodiments of the present disclosure may be capable of detecting small objects in an image.

Table 2 below shows object detection (e.g., instance segmentation) by proposed models and an object detection model based on the example convolutional neural network discussed with respect to FIG. 26. "Inst. mask" indicates a bounding shape mask of the present disclosure. Even though the same or similar network (ResNet50) was used as the backbone of the feature extractor 110 (refer to FIG. 1), it may be observed that a convolutional neural network system in accordance with some example embodiments of the present disclosure obtained the highest scores in most fields.

obstacles. As a third example, such a neural network system 100 may utilize object detection, location, and/or classification as a part of a machine vision system of a robot that may be used in a public, residential, commercial, industrial, scientific, and/or military context. Many such scenarios may include object detection, location, and/or classification using convolutional neural network systems such as disclosed herein as standalone systems and/or as elements of broader systems, such as an ensembles of image processing, machine vision, statistical classification, and/or deep learning components, such as restricted Boltzmann machines (RBM), deep belief networks, tree-based classifiers such as random forests, Bayesian classifiers, recurrent or reentrant neural networks, inceptive neural networks, capsule networks, etc.

According to some example embodiments of the present disclosure, an efficiency of learning of a convolutional neural network system may be improved by changing a pixel thickness of a real mask used for learning.

While some inventive concepts have been described with reference to some example embodiments thereof, it may be apparent to those of ordinary skill in the art that various changes and modifications may be made thereto without

TABLE 2

| Instance Seg | backbone | $AP_{mk}$ | Person | Rider | Car | Truck | Bus | Train | mcycle | bicycle |
|---|---|---|---|---|---|---|---|---|---|---|
| InstanceC[10] | R-50 | 15.8 | 10.0 | 8.0 | 23.7 | 14.0 | 19.5 | 15.2 | 9.3 | 4.7 |
| DWT[1] | R-50 | 19.8 | 15.1 | 11.7 | 32.9 | 17.1 | 20.4 | 15.0 | 7.9 | 4.9 |
| SGN[16] | R-50 | 29.2 | 21.8 | 20.1 | 39.4 | 24.8 | 33.2 | 30.8 | 17.7 | 12.4 |
| Mask R-CNN[9] | R-50 | 36.4 | 34.8 | 27.0 | 49.1 | 30.1 | 40.9 | 30.9 | 21.4 | 18.7 |
| S-Bshape | R-50 | 69.9 | 35.2 | 27.7 | 50.4 | 31.5 | 39.7 | 30.4 | 24.7 | 19.1 |
| +Inst. mask | R-50 | 37.2 | 35.7 | 28.1 | 50.7 | 31.6 | 39.8 | 30.7 | 24.8 | 19.3 |

In some example embodiments, a neural network system 100 trained in accordance with the present disclosure may be utilized in a variety of scenarios. As a first example, such a neural network system 100 may utilize object detection, location, and/or classification as a part of an image processing system, such as scanning of printed media (such as optical character recognition) and/or processing of still or moving images from a still or motion camera in one or more departing from the spirit and scope of some example embodiments of some inventive concepts as set forth in the following claims. For example, some example embodiments presented herein may exhibit an example organization of components, such as the example set of components in the example of FIG. 1. Other example embodiments may include a different organization of components, such as renaming, rearranging, adding, partitioning, duplicating, merging, and/or removing components, sets of components, and relationships thereamong, without departing from the scope of the present disclosure. All such variations that are reasonably technically and logically possible, and that are not contradictory with other statements, are intended to be included in this disclosure, the scope of which is to be understood as being limited only by the claims.

What is claimed is:

1. A computer-readable medium including a program code that, when executed by processing circuitry, causes the processing circuitry to:
perform a convolution operation on an input image to generate a feature map;
extract a region of interest based on an objectness score associated with an existence of an object from the feature map;
align the extracted region of interest to a region of interest having a reference size;
determine a class of the object and position information of the object on the input image based on the aligned region of interest;
form a boundary encompassing the object on the input image based on a result of the determination; and
learn a convolutional neural network system based on a predicted mask based on the class, the position information, the boundary, and/or a real mask based on a real boundary of the object of the input image,
wherein the real mask includes first pixels corresponding to the real boundary and second pixels corresponding to a fake boundary adjacent to the real boundary.

2. The computer-readable medium of claim 1, wherein a pixel value of the first pixels is greater than a pixel value of the second pixels.

3. The computer-readable medium of claim 1, wherein a pixel value of the first pixels is the same as a pixel value of the second pixels.

4. The computer-readable medium of claim 1, wherein the second pixels are adjacent to an outer side of the real boundary composed of the first pixels,
wherein the fake boundary is a first fake boundary, and
wherein the real mask further includes third pixels corresponding to the first fake boundary adjacent to an inner side of the real boundary.

5. The computer-readable medium of claim 1, wherein the second pixels are adjacent to an inner side of the real boundary composed of the first pixels,
wherein the fake boundary is a first fake boundary, and
wherein the real mask further includes third pixels corresponding to the first fake boundary adjacent to an outer side of the real boundary.

6. The computer-readable medium of claim 1, wherein the program code, when executed by the processing circuitry, causes the processing circuitry to further search the feature map in a window sliding manner by using a plurality of anchors, in the extracting of the region of interest.

7. The computer-readable medium of claim 1, wherein the program code, when executed by the processing circuitry, causes the processing circuitry to further perform a fully-connected operation on the aligned region of interest in the forming of the boundary, and
wherein the class and the position information of the object are generated based on a result of the fully-connected operation.

8. The computer-readable medium of claim 1, wherein a thickness of the fake boundary is greater than a thickness of the real boundary.

9. The computer-readable medium of claim 1, wherein the program code, when executed by the processing circuitry, causes the processing circuitry to learn the convolutional neural network system through a backpropagation, based on error information that is based on the predicted mask and the real mask.

10. The computer-readable medium of claim 1, wherein the program code, when executed by the processing circuitry, causes the processing circuitry to perform the determining of the class of the object, the determining of the position information of the object, and the forming of the boundary in parallel.

11. A computer-readable medium including a program code that, when executed by processing circuitry, causes the processing circuitry to:
perform a convolution operation on an input image to generate a feature map;
extract a region of interest based on an objectness score associated with an existence of an object from the feature map;
align the extracted region of interest to a region of interest having a reference size;
determine a class of the object and position information of the object on the input image based on the aligned region of interest;
form a boundary encompassing the object on the input image based on a result of the determination; and
learn a convolutional neural network system based on a predicted mask based on the class, the position information, and the boundary, and a real mask including a real bounding box encompassing the object of the input image,
wherein the real mask includes first pixels corresponding to the real bounding box and second pixels corresponding to a fake bounding box adjacent to the real bounding box.

12. The computer-readable medium of claim 11, wherein the second pixels are adjacent to an outer side of the real bounding box composed of the first pixels,
wherein the fake bounding box is a first fake bounding box, and
wherein the real mask further includes third pixels corresponding to the first fake bounding box adjacent to an inner side of the real bounding box.

13. The computer-readable medium of claim 12, wherein a pixel value of the first pixels, a pixel value of the second pixels, and a pixel value of the third pixels are the same.

14. The computer-readable medium of claim 12, wherein a pixel value of the first pixels is greater than a pixel value of the second pixels and a pixel value of the third pixels.

15. The computer-readable medium of claim 12, wherein the second pixels are adjacent to an inner side of the real bounding box composed of the first pixels,
wherein the fake bounding box is a first fake bounding box, and
wherein the real mask further includes third pixels corresponding to the first fake bounding box adjacent to an outer side of the real bounding box.

16. A convolutional neural network system comprising:
processing circuitry configured to,
perform a convolution operation on an input image to generate a feature map;
extract a region of interest based on an objectness score associated with an existence of an object from the feature map;
align the extracted region of interest to a region of interest having a reference size;

determine a class of the object, based on the aligned region of interest;
determine position information of the object on the input image, based on the aligned region of interest; and
form a boundary encompassing the object on the input image, and
learn based on a predicted mask based on the class, the position information, the boundary, and/or a real mask based on a real boundary of the object of the input image,
wherein the real mask includes first pixels corresponding to the real boundary and second pixels corresponding to a fake boundary adjacent to the real boundary.

17. The convolutional neural network system of claim 16, wherein the processing circuitry is configure dot extract the region of interest using a region proposal network (RPN).

18. The convolutional neural network system of claim 16, wherein the processing circuitry is configured to determine the class of the object and the position information of the object on the input image using a plurality of fully-connected networks.

19. The convolutional neural network system of claim 16, wherein the second pixels are adjacent to an outer side of the real boundary composed of the first pixels,
wherein a fake boundary is a first fake boundary, and
wherein the real mask further includes third pixels corresponding to the first fake boundary adjacent to an inner side of the real boundary.

20. The convolutional neural network system of claim 19, wherein a pixel value of the first pixels, a pixel value of the second pixels, and a pixel value of the third pixels are the same, or
wherein the pixel value of the first pixels is greater than the pixel value of the second pixels and the pixel value of the third pixels.

\* \* \* \* \*